US012728608B2

(12) United States Patent
Halahmi et al.

(10) Patent No.: US 12,728,608 B2
(45) Date of Patent: Sep. 8, 2026

(54) FORMING A COMBINED LENS

(71) Applicant: ADDON OPTICS LTD., Netanya (IL)

(72) Inventors: Izhar Halahmi, Hod Hasharon (IL); Haim Engler, Hashmonaim (IL); Jed Arkin, Savyon (IL); Amir Erlichman, Herzelia (IL); Roy Cohen, Beit Yanai (IL); Arye Bar Erez, Kfar Sirkin (IL)

(73) Assignee: ADDON OPTICS LTD., Netanya (IL)

( * ) Notice: Subject to any disclaimer, the term of this patent is extended or adjusted under 35 U.S.C. 154(b) by 742 days.

(21) Appl. No.: 18/051,140

(22) Filed: Oct. 31, 2022

(65) Prior Publication Data

US 2023/0077339 A1 Mar. 16, 2023

Related U.S. Application Data

(63) Continuation of application No. 17/904,269, filed as application No. PCT/IB2021/052164 on Mar. 16, 2021, now Pat. No. 12,565,017.

(60) Provisional application No. 63/002,388, filed on Mar. 31, 2020, provisional application No. 63/002,393, filed on Mar. 31, 2020.

(51) Int. Cl.

| | |
|---|---|
| ***B29D 11/00*** | (2006.01) |
| ***G02B 1/10*** | (2015.01) |
| ***G02C 7/02*** | (2006.01) |
| *B29K 101/12* | (2006.01) |

(52) U.S. Cl.

CPC .... *B29D 11/0073* (2013.01); *B29D 11/00009* (2013.01); *B29D 11/00865* (2013.01); *G02B 1/10* (2013.01); *G02C 7/02* (2013.01); *G02C 7/024* (2013.01); *B29K 2101/12* (2013.01); *B29K 2995/0039* (2013.01)

(58) Field of Classification Search

None

See application file for complete search history.

(56) References Cited

U.S. PATENT DOCUMENTS

| | | | |
|---|---|---|---|
| 2,511,329 | A | 6/1950 | Edward |
| 2,759,394 | A | 8/1956 | Evans |
| 3,628,854 | A | 12/1971 | Jampolsky |

(Continued)

FOREIGN PATENT DOCUMENTS

| | | | |
|---|---|---|---|
| CA | 2360230 | A1 | 7/2000 |
| CN | 101140360 | A | 3/2008 |

(Continued)

OTHER PUBLICATIONS

Decision on Reexamination Rejection for Chinese Application No. 202080067832.9 mailed Dec. 6, 2024.

(Continued)

*Primary Examiner* — Christopher T Schatz

(74) *Attorney, Agent, or Firm* — Ballard Spahr LLP

(57) ABSTRACT

Apparatus and methods are described including adhering a first lens to a second lens such as to form a combined lens having a given optical design, by placing the first lens and the second lens in respective first and second pressure chambers with an adhesive layer disposed between the first lens and the second lens, bringing a convex surface of the first lens into contact with the adhesive layer, and bringing a concave surface of the second lens into contact with the adhesive layer. Other applications are also described.

18 Claims, 13 Drawing Sheets

(56) References Cited

U.S. PATENT DOCUMENTS 3,877,798 A 4/1975 Tolar et al.
3,904,281 A 9/1975 Jampolsky
4,152,188 A * 5/1979 Friedrich .......... B32B 17/10844 156/286
4,173,606 A 11/1979 Kalal et al.
4,547,049 A 10/1985 Cotie
4,650,275 A 3/1987 Jones
4,781,452 A 11/1988 Ace
4,859,261 A 8/1989 Ace
4,867,553 A 9/1989 Frieder
4,883,548 A 11/1989 Onoki
4,921,626 A 5/1990 Rhodenbaugh
4,923,758 A 5/1990 Marks et al.
4,969,729 A 11/1990 Merle
5,420,651 A 5/1995 Kamppeter
5,434,707 A * 7/1995 Dalzell .................... G02C 7/12 264/1.32
5,478,824 A 12/1995 Burns et al.
5,617,153 A 4/1997 Allen et al.
5,677,751 A 10/1997 Gerber
5,748,279 A 5/1998 Glanzbergh
5,764,333 A 6/1998 Somsel
5,790,227 A 8/1998 Rorabaugh
5,926,250 A 7/1999 Mukaiyama et al.
6,019,470 A 2/2000 Mukaiyama et al.
6,027,214 A 2/2000 Graham
6,139,148 A 10/2000 Menezes
6,170,952 B1 1/2001 La et al.
6,244,705 B1 6/2001 Ledbetter et al.
6,258,218 B1 7/2001 Burton
6,290,354 B1 9/2001 Safran
6,807,824 B1 10/2004 Miwa
6,881,269 B2 4/2005 Matsuzawa et al.
7,036,929 B1 5/2006 Harvey
7,250,197 B2 7/2007 Rastogi et al.
7,934,831 B2 5/2011 Spivey et al.
8,042,941 B2 10/2011 Alonso et al.
8,202,392 B2 6/2012 Jiang et al.
8,702,230 B2 4/2014 Yi et al.
8,714,739 B2 5/2014 Rouault De Coligny
9,156,213 B2 10/2015 Qiu et al.
9,529,118 B2 12/2016 Ryu et al.
9,733,489 B2 8/2017 Paille et al.
9,915,830 B2 3/2018 Curley et al.
9,995,948 B2 6/2018 Arieli et al.
10,126,571 B2 11/2018 Junkins
10,437,309 B2 10/2019 Milford
10,712,591 B2 7/2020 Arieli et al.
11,378,821 B2 7/2022 Katzman et al.
11,745,476 B2 9/2023 Katzman et al.
2002/0149739 A1 10/2002 Perrott et al.
2003/0017340 A1 1/2003 Jiang et al.
2003/0048405 A1 3/2003 Rivera
2004/0055994 A1 3/2004 Miwva
2004/0126587 A1 7/2004 Maki et al.
2007/0121058 A1 5/2007 Chuang
2007/0270062 A1* 11/2007 Weber ................... B29C 66/545 442/65
2009/0004478 A1 1/2009 Baetzold et al.
2009/0046242 A1 2/2009 Nicolson et al.
2010/0006219 A1* 1/2010 Baranton ......... B29D 11/00865 156/286
2010/0007846 A1 1/2010 Fermigier et al.
2010/0007847 A1 1/2010 Cano et al.
2010/0193112 A1 8/2010 Bovet et al.
2010/0208197 A1 8/2010 Carimalo et al.
2010/0238400 A1 9/2010 Volk
2010/0239776 A1 9/2010 Yajima et al.
2010/0259717 A1 10/2010 Fermigier et al.
2011/0146893 A1 6/2011 Marty
2011/0181828 A1 7/2011 Yi et al.
2012/0013980 A1 1/2012 Begon
2012/0249949 A1 10/2012 Miyoshi
2012/0262666 A1 10/2012 Boinard
2013/0070196 A1 3/2013 Tokumaru
2013/0154906 A1 6/2013 Braun et al.
2014/0151911 A1 6/2014 Tokumaru
2015/0049306 A1 2/2015 Haddadi et al.
2015/0286070 A1 10/2015 Aikawa
2016/0109622 A1 4/2016 Yoshida
2016/0161761 A1 6/2016 Quere et al.
2016/0178934 A1 6/2016 Curley et al.
2016/0252747 A1 9/2016 Lortscher
2016/0311184 A1 10/2016 Gourraud
2017/0059885 A1 3/2017 Patel
2017/0059886 A1 3/2017 Fayolle et al.
2017/0156587 A1 6/2017 Rifai et al.
2017/0188813 A1 7/2017 Arnold et al.
2017/0235130 A1 8/2017 Baker
2017/0269379 A1 9/2017 Arieli et al.
2017/0299886 A1 10/2017 Carmon et al.
2018/0077992 A1 3/2018 Kataoka et al.
2018/0259794 A1 9/2018 Arieli et al.
2019/0212564 A1 7/2019 Rousseau et al.
2019/0324290 A1 10/2019 El-hajal et al.
2020/0285074 A1 9/2020 Zimanyi
2020/0301171 A1 9/2020 Arieli et al.
2021/0387303 A1 12/2021 Katzman et al.
2022/0244542 A1 8/2022 Bouchier et al.
2022/0326547 A1 10/2022 Bakaraju
2023/0089288 A1 3/2023 Fujinaka
2023/0127754 A1 4/2023 Arkin et al.

FOREIGN PATENT DOCUMENTS

CN 101467076 A 6/2009
CN 101466528 9/2009
CN 101743501 A 6/2010
CN 103197436 A 7/2013
CN 106461978 A 2/2017
CN 206725875 U 12/2017
CN 110515219 A 11/2019
EP 1870738 A2 12/2007
EP 4159423 A1 4/2023
EP 3615318 B1 8/2023
GB 1100148 A 1/1968
JP S4870647 A 9/1973
JP S5336252 B1 10/1978
JP S62263021 11/1987
JP 01026818 A 1/1989
JP S6426818 U 2/1989
JP 04120927 U 10/1992
JP H058534 U 2/1993
JP H0572504 3/1993
JP H09154479 A 6/1997
JP H10233430 9/1998
JP 2002539500 A 11/2002
JP 2005249842 A 9/2005
JP 2007102057 A 4/2007
JP 2010033070 A 2/2010
JP 2010507834 A 3/2010
JP 2010508552 A 3/2010
JP 2011201267 10/2011
JP 2012038880 2/2012
JP 2012128458 A 7/2012
JP 2014200943 A 10/2014
JP 2016539366 12/2016
JP 2017516161 A 6/2017
JP 2022537025 A 8/2022
WO 0055680 A1 9/2000
WO 0071330 A1 11/2000
WO 0105578 A1 1/2001
WO 2003023495 A2 3/2003
WO 2009014086 1/2009
WO 2009103359 A1 8/2009
WO 2011074076 6/2011
WO 2011105055 9/2011
WO 2011155550 12/2011
WO 2013169987 A1 11/2013
WO 2014084339 A1 6/2014
WO 2014189078 11/2014
WO 2015124574 A1 8/2015
WO 2015173797 A1 11/2015
WO 2017042612 A1 3/2017

(56) References Cited

FOREIGN PATENT DOCUMENTS

| | | | |
|---|---|---|---|
| WO | 2019049835 | | 3/2019 |
| WO | 2019219627 | A1 | 11/2019 |
| WO | 2021059128 | A1 | 4/2021 |
| WO | 2021161125 | A1 | 8/2021 |
| WO | 2021198822 | A1 | 10/2021 |
| WO | 2024100506 | A1 | 5/2024 |

OTHER PUBLICATIONS

Examination Report for Australian Application No. 2020351724 mailed Apr. 4, 2025.
Examination Report for European Application No. 20786059.4 mailed Mar. 11, 2025.
International Search Report and Written Opinion from International Application No. PCT/IB2024/059588 mailed Feb. 24, 2025.
Non-Final Office Action for U.S. Appl. No. 17/763,351 mailed Jan. 27, 2025.
Non-Final Office Action for U.S. Appl. No. 17/904,036 mailed Apr. 23, 2025.
Non-Final Office Action for U.S. Appl. No. 17/904,269 mailed Apr. 3, 2025.
Office Action for Chinese Application No. 202180019255.0 mailed Mar. 18, 2025.
Office Action for Korean Application No. 10-2022-7014044 mailed Feb. 28, 2025.
Corrected Notice of Allowability for U.S. Appl. No. 16/718,448 mailed Jun. 2, 2022.
Decision of Dismissal of Amendment for Japanese Application No. 2017-51246 mailed Aug. 31, 2020.
Decision of Rejection for Chinese Application No. 201580029313.2 mailed Mar. 11, 2020.
Decision of Rejection for Japanese Application No. 2017-51246 mailed Aug. 20, 2020.
Decision to Refuse for European Application No. 15793232.8 malled Jan. 22, 2019.
Examination Report for Australian Application No. 201260773 mailed Jun. 6, 2019.
Examination Report for Australian Application No. 2020201126 mailed Feb. 11, 2021.
Examination Report for European Application No. 15793232.8 mailed Sep. 15, 2017.
Examination Report for Indian Application No. 201627037817 mailed Oct. 31, 2020.
Extended European Search Report for European Application No. 15793232.8 mailed May 24, 2017.
International Search Report and Written Opinion from International Application No. PCT/IB2020/058844 mailed Dec. 15, 2020.
International Search Report and Written Opinion from International Application No. PCT/IB2021/050759 mailed Jul. 16, 2021.
International Search Report and Written Opinion from International Application No. PCT/IB2021/052164 mailed Sep. 22, 2021.
International Search Report and Written Opinion from International Application No. PCT/IL2015/050475 mailed Sep. 16, 2015.
Invitation to pay Additional Fees for International Application No. PCT/IB2021/050759 mailed Apr. 30, 2021.
Invitation to Pay Additional Fees for International Application No. PCT/IB2021/052164 mailed Jun. 28, 2021.
Issue Notification for U.S. Appl. No. 15/310,356 mailed May 23, 2018.
Issue Notification for U.S. Appl. No. 16/718,448 mailed Jun. 15, 2022.
Minutes of Oral Proceedings for European Application No. 15793232.8 mailed Nov. 27, 2018.
Non-Final Office Action for U.S. Appl. No. 15/976,669 mailed Sep. 9, 2019.
Non-Final Office Action for U.S. Appl. No. 16/718,448 Mailed Dec. 17, 2021.
Non-Final Office Action for U.S. Appl. No. 16/898,954 mailed Oct. 27, 2022.
Notice of Acceptance for Australian Application No. 2015260773 mailed Nov. 13, 2019.
Notice of Allowance for U.S. Appl. No. 15/310,356 mailed Apr. 16, 2018.
Notice of Allowance for U.S. Appl. No. 15/310,356 mailed Jan. 26, 2018.
Notice of Allowance for U.S. Appl. No. 15/976,669 mailed Jan. 10, 2020.
Notice of Allowance for U.S. Appl. No. 15/976,669 mailed Jun. 4, 2020.
Notice of Allowance for U.S. Appl. No. 16/718,448 mailed Mar. 30, 2022.
Notice of Re-examination of Chinese Application No. 201580029313.2 mailed Jul. 29, 2021.
Office Action for Brazilian Application No. 11 2016 026162 3 mailed Feb. 28, 2022.
Office Action for Chinese Application No. 201580029313.2 mailed May 22, 2019.
Office Action for Chinese Application No. 201580029313.2 mailed Oct. 3, 2019.
Office Action for Chinese Application No. 201580029313.2 mailed Sep. 3, 2018.
Office Action for Japanese Application No. 2017512464 mailed Feb. 27, 2019.
Office Action for Japanese Application No. 2017-512464 mailed Nov. 25, 2019.
Result of Telephone Consultation for European Application No. 15793232.8 mailed Nov. 5, 2018.
Summons to Attend Oral Hearing for European Application No. 15793232.8 mailed Apr. 10, 2018.
Summons to Attend Oral Hearing for European Application No. 15793232.8 mailed May 27, 2021.
U.S. Appl. No. 15/310,356, filed Nov. 10, 2016.
U.S. Appl. No. 15/976,669, filed May 10, 2018.
U.S. Appl. No. 16/718,448, filed Dec. 18, 2019.
U.S. Appl. No. 17/763,351, filed Mar. 24, 2022.
U.S. Appl. No. 17/904,036, filed Aug. 11, 2022.
U.S. Appl. No. 17/904,269, filed Aug. 15, 2022.
U.S. Appl. No. 61/991,514, filed May 11, 2014.
U.S. Appl. No. 62/906,157, filed Sep. 26, 2019.
U.S. Appl. No. 62/977,313, filed Feb. 16, 2020.
U.S. Appl. No. 63/002,388, filed Mar. 31, 2020.
U.S. Appl. No. 63/002,393, filed Mar. 31, 2020.
Written Opinion from International Application No. PCT/IB2021/052164 mailed Feb. 9, 2022.
Chou, et al., “Effect of Multiple Antireflection Coatings on Impact Resistance of Hoya Phoenix Spectacle Lenses”, Optom Exp Clin, 2006, pp. 86-89.
Meslin, “Opthalmic Optics: Materials and Treatments”, Europe Essilor Academy, 2010, 68.
Decision of Rejection for Chinese Application No. 202080067832.9 mailed Dec. 27, 2023.
International Search Report and Written Opinion from International Application No. PCT/IB2023/061107 mailed Feb. 27, 2024.
Non-Final Office Action for U.S. Appl. No. 17/763,351 mailed May 20, 2024.
Office Action for Japanese Application No. 2022-509599 mailed Feb. 19, 2024.
U.S. Appl. No. 63/233,567, filed Aug. 16, 2021.
Office Action for Japanese Application No. JP2022-549827 mailed Apr. 18, 2025.
Office Action for Japanese Application No. 2022-168193 mailed Apr. 18, 2025.
Office Action for Chinese Application No. 202211248167.0 mailed Apr. 29, 2025.
Examination Report for Indian Application No. 202247008235 mailed Jun. 30, 2025.
U.S. Appl. No. 63/424,915, filed Nov. 13, 2022.
Illinger, “Effect of Adhesive on the Impact Resistance of Laminated Plastics for Windshield Applications”, Army Materials and Mechanics Research Center, Aug. 1973, pp. 1-13.
Corrected Notice of Allowance for U.S. Appl. No. 16/898,954 mailed Mar. 31, 2023.

(56) References Cited

OTHER PUBLICATIONS

Examination Report for Indian Application No. 202247051124 mailed Feb. 27, 2023.
Examination Report for Indian Application No. 202248053824 mailed Mar. 1, 2023.
Extended European Search Report for European Application No. 22206182.2 mailed Feb. 27, 2023.
International Search Report and Written Opinion from International Application No. PCT/IB2022/057416 mailed Nov. 22, 2022.
Issue Notification for U.S. Appl. No. 16/898,954 mailed Jul. 19, 2023.
Notice of Allowance for U.S. Appl. No. 16/898,954 mailed on Mar. 20, 2023.
Notice of Allowance for U.S. Appl. No. 17/763,351 mailed Oct. 1, 2024.
Office Action for Canadian Application No. 3,151,806 mailed Jun. 12, 2024.
Office Action for Canadian Application No. 3,170,681 mailed Aug. 6, 2024.
Office Action for Chinese Application No. 202080067832.9 mailed Oct. 18, 2024.
Office Action for Japanese Application No. 2022-509599 mailed Sep. 11, 2024.
Examination Report for Indian Patent Application No. 2022215264 mailed Jul. 24, 2023.
Hearing Notice for Indian Application No. 201627037817 mailed Nov. 16, 2023.
Office Action for Canadian Application No. 3,151,806 mailed Aug. 9, 2023.
Office Action for Canadian Application No. 3,170,681 mailed Oct. 20, 2023.
Office Action for Chinese Application No. 202080067832.9 mailed Jul. 1, 2023.
Corrected Notice of Allowance for U.S. Appl. No. 17/763,351 mailed Aug. 21, 2025.
Issue Notification for U.S. Appl. No. 17/763,351 mailed Sep. 3, 2025.
Office Action for Brazilian Application No. 11 2022 005600 1 mailed Oct. 19, 2025.
Office Action for Japanese Application No. 2025-006904 mailed Jan. 5, 2026.
Corrected Notice of Allowability for U.S. Appl. No. 17/904,269 mailed Jan. 16, 2026.
Hearing Notice for Indian Application No. 202247051124 mailed Oct. 29, 2025.
Hearing Notice for Indian Application No. 202248053824 mailed Oct. 29, 2025.
Issue Notification for U.S. Appl. No. 17/904,269 mailed Feb. 18, 2026.
Issue Notification for U.S. Appl. No. 18/683,129 mailed Oct. 15, 2025.
Notice of Allowance for U.S. Appl. No. 17/763,351 mailed May 13, 2025.
Notice of Allowance for U.S. Appl. No. 17/904,036 mailed Dec. 17, 2025.
Notice of Allowance for U.S. Appl. No. 17/904,269 mailed Oct. 3, 2025.
Office Action for Canadian Application No. 3,151,806 mailed Jul. 15, 2025.
Office Action for Japanese Application No. 2022-168193 mailed Dec. 22, 2025.
Office Action for Japanese Application No. 2022-549827 mailed Dec. 18, 2025.

* cited by examiner 45
44
40
24
42

FORMING A COMBINED LENS

CROSS-REFERENCE TO RELATED APPLICATIONS

The present application is a continuation of U.S. application Ser. No. 17/904,269 to Halahmi filed Aug. 15, 2022, which is a US national phase of International Application PCT/IB2021/052164 to Halahmi et al., filed Mar. 16, 2021 (published as WO 21/198822), entitled "Shaping an ophthalmic lens," which claims priority from:

U.S. Provisional Patent Application No. 63/002,388 to Halahmi et al., filed Mar. 31, 2020, entitled "Shaping an ophthalmic lens," and U.S. Provisional Patent Application No. 63/002,393 to Halahmi et al., filed Mar. 31, 2020, entitled "Stress-release procedure for an ophthalmic lens."

Both of the above-referenced U.S. Provisional applications are incorporated herein by reference.

FIELD OF EMBODIMENTS OF THE INVENTION

Some applications of the present invention generally relate to ophthalmic lenses. In particular, some applications relate to shaping an ophthalmic lens.

BACKGROUND

Ophthalmic lenses are typically made of amorphous viscoelastic polymers, which exhibit both elastic and plastic properties. In theoretical materials having pure elastic properties, strain is exhibited immediately as response to stress. In theoretical materials having pure plastic properties, strain resulting from stress is exhibited at a delay (ranging from milliseconds to years) with respect to application of stress to the material. Phenomena related to plasticity are creep (in which strain changes continuously as long as stress is applied to a plastic material) and relaxation (in which stress declines as long as a plastic material is held in predefined dimensions and has internal pre-loaded stress).

When a theoretical, pure plastic material is loaded by a stress that varies in a sinusoidal manner, the resulting strain is detected, but after a delay, which can be characterized as a phase shift. Real-world materials are typically viscoelastic, exhibiting both plastic and elastic properties. A viscoelastic material exhibits a phase shift, but a smaller one than that of a theoretical, pure plastic material. This is indicated in FIG. 1, which shows a sinusoidal stress-versus-time curve and a resultant sinusoidal strain-versus-time curve, the strain-versus-time curve occurring at a phase shift with respect to the stress-versus-time curve.

A viscoelastic material's response to the application of mechanical energy to the material may be characterized by its storage modulus (E') and its loss modulus (E"), both of which are temperature dependent. The material's storage modulus is a measure of its elastic behavior, i.e., the extent to which mechanical energy that is applied to the material is stored in bond stretching along polymer chains, such as to be released during recovery. Loss modulus is a measure of the material's plastic behavior, i.e., the extent to which mechanical energy that is applied to the material is lost due to internal friction between polymer chains (such energy not being stored and subsequently released). A further parameter, which is also temperature dependent, and which is known as the Tan Delta of the material, measures the ratio of the loss modulus to the storage modulus at any temperature. As such, a material's Tan Delta is a measure of the tendency of the material to be dissipative and dimensionally unstable. As noted, typically, all three of the aforementioned parameters (i.e., storage modulus, loss modulus, and Tan Delta) vary as the material's temperature varies. The aforementioned parameters are determined by analyzing the material using Dynamic Mechanical Analysis (also known as "DMA analysis").

Presbyopia is a condition that gradually affects most of the population over age 40. The condition results in progressively worsening ability to focus clearly on close objects. Presbyopia is usually treated with multifocal eyeglasses, progressive eyeglasses or contact lenses, since laser-assisted in situ keratomileusis (i.e., LASIK) and other types of surgery are unsuitable for treating this condition.

Corrective lenses are used in eyeglasses to correct presbyopia and other disorders of accommodation. Many people who suffer from presbyopia, additionally suffer from myopia (i.e., near-sightedness). A basic solution for such people is the use of multifocal spectacle lenses. Multifocal spectacle lenses contain two or more lens powers, with each power being suitable for objects that are at respective distances. Bifocals contain two lens powers; trifocals contain three. Progressive spectacle lenses are characterized by a gradient of increasing lens power. The gradient starts at the wearer's distance prescription and reaches a maximum addition power, or the full reading addition, in the lower portion of the lens. The addition in the middle of the lens usually enables clear vision in intermediate ranges, such as reading text on a computer screen. The length of the progressive power gradient on the lens surface depends on the design of the lens, with a final addition power typically being between 0.50 and 3.50 diopters. The addition value prescribed depends on the level of presbyopia of the patient.

SUMMARY OF EMBODIMENTS

In accordance with some applications of the present invention, one or more lenses are made of a base lens and an additional lens adhered to the base lens. For some applications, the additional lens is a progressive lens, and the base lens is a single-focus, corrective lens (e.g., a far-vision corrective lens), with the optical design of the additional lens being such that, upon being adhered to the base lens, the combined lens becomes a progressive lens that matches a desired prescription.

As described hereinabove in the Background section, a viscoelastic material's response to the application of mechanical energy to the material may be characterized by its storage modulus (E') and its loss modulus (E"). The material's storage modulus is a measure of its elastic behavior, i.e., the extent to which mechanical energy that is applied to the material is stored in bond stretching along polymer chains, such as to be released during recovery. Loss modulus is a measure of the material's plastic behavior, i.e., the extent to which mechanical energy that is applied to the material is lost due to internal friction between polymer chains (such energy not being stored and subsequently released). A further parameter, which is known as the Tan Delta of the material, measures the ratio of the loss modulus to the storage modulus. As such, a material's Tan Delta is a measure of the tendency of the material to be dissipative and dimensionally unstable. Typically, all three of the aforementioned parameters (i.e., storage modulus, loss modulus, and Tan Delta) vary as the material's temperature varies. The aforementioned parameters are determined by analyzing the material using Dynamic Mechanical Analysis (also known as "DMA analysis").

Typically, the additional lens is made of an amorphous viscoelastic polymer and is initially formed such as to exhibit a given lens optical design, in accordance with the needs described hereinabove (e.g., such that, upon being adhered to the base lens, the combination of the base lens and the additional lens forms a progressive lens). For example, the additional lens may initially be formed using a forming process such as injection molding, injection-compression molding, compression molding, stamping, 3D-printing, and/or casting. In order to adhere the additional lens to the base lens, it is typically desirable that the additional lens undergo a further shaping procedure such that its curvature conforms with the curvature of the base lens. In particular, the surface of the additional lens that is adhered to the base lens needs to be shaped to substantially conform with the surface of the base lens to which it is adhered. It is noted that, in some cases, the curvature of the additional lens is made to be slightly greater than that of the base lens, in order to facilitate an adhesion process described herein. Furthermore, it is noted that, in some cases, and in particular if the curvatures of the additional lens and the base lens are similar to each other, it is not necessary to shape the additional lens prior to the adhesion step. However, the inventors have found that a significant proportion of combinations of additional and base lenses typically require a shaping technique as described herein to be durably applied to the additional lens. This is particularly the case when the ophthalmic prescription includes cylinder with associated cylinder axis values, which tends to have an impact on the concave curvature of the base lens.

It is noted that an alternative to reshaping the additional lens such that its curvature conforms with the curvature of the base lens would be to initially shape the additional lens such that it has the desired optical design and is also shaped to conform with the shape of the base lens. However, this would greatly increase the number of additional lenses that would need to be stocked by a retailer or optical laboratory, since it would be necessary to stock separate stock-keeping units of additional lenses having a given optical design but having different curvatures, such as to conform with respective differently-shaped base lenses. (As noted above, this is particularly the case when the ophthalmic prescription includes cylinder with associated cylinder axis values, which tends to have an impact on the concave curvature of the base lens.) Alternatively, this would mean that additional lenses would have to be manufactured in a bespoke manner (based upon a patient's optical requirements and choice of base lens), in which case many of the advantages of manufacturing a progressive lens using a base lens and an additional lens, rather than using traditional manufacturing techniques, would be lost.

Lens shaping is highly challenging due to the fact that the predesignated sub-areas of the lens are very accurate (at a level of thickness difference of microns). Shaping a progressive lens in an uncontrolled manner risks ruining the optical value of the lens. It is desirable that, after the additional lens is shaped in the above-described manner, the additional lens not only retains its optical design at predesignated, clinically important sub-areas to within ISO standard after being reshaped and adhered to the base lens, but also retains approximately the same residual cylinder quantities at predesignated, clinically important sub-areas of the lens. Further typically, it is desirable that the retention by the lens of its original optical design to within tolerance at the predesignated sub-areas of the lens be achieved without the ophthalmic lens retaining significant internal stresses (of the type that could lead to the additional lens rupturing, or undergoing a stress crack during its lifetime). For some applications, by applying the lens-shaping process described herein, the curvature of the additional lens may be changed by more than plus/minus 1 diopters (e.g., more than plus/minus 2 diopters), and/or up to plus/minus 4 diopters (e.g., up to plus/minus 3 diopters), while retaining the lens optical design and without introducing significant stresses into the lens (as described above).

The inventors of the present application have found that, if the additional lens is shaped at temperatures at which the Tan Delta is greater than 0.8 (or in some cases greater than 0.5 or 0.3), this typically causes irreversible damage to the lens optical design. This is because when the lens is shaped under stress at such temperatures, deformation of the lens typically causes plastic deformation, such that when the lens returns to ambient temperature, components of its optical design are lost, and unwanted cylinder may appear. On the other hand, the inventors have found that, if the additional lens is shaped at temperatures at which the Tan Delta is below 0.2 (and in some cases below 0.5, or below 0.3), this allows the additional lens to retain its lens optical design, but leaves internal stresses in the lens that later may develop into cracks, or regions in which the lens loses its transparency due to stresses. For example, the lens may form cracks as a result of the internal stress in combination with thermal cycles, thermal shocks, mechanical shock, or environmental stress (e.g., due to chemical cleaning materials, and/or or bodily-secreted fluids). The phenomenon of slow cracking of polymers, especially amorphous ones, is well known and is further accelerated by fats (e.g., human fat or grease, from hand or face), oils, cleaning agents and soaps, that are likely to come into contact with the additional lens during its life cycle. An additional risk associated with shaping the additional lens at temperatures at which the Tan Delta is below 0.2 (and in some cases below 0.5, or below 0.3) is that the additional lens will tend to revert to its original shape, which will cause it to become separated from the base lens.

Therefore, in accordance with some applications of the present invention, the additional lens is shaped at a temperature at which the material from which the additional lens is made has a Tan Delta of more than 0.2 and/or less than 0.8. For some applications, the additional lens is shaped at a temperature at which the material from which the additional lens is made has a Tan Delta of 0.2-0.5, or 0.2-0.3. Alternatively or additionally, the additional lens is shaped at a temperature at which the material from which the additional lens is made has a Tan Delta of 0.3-0.8, or 0.5-0.8. Further typically, the temperature at which the additional lens is shaped is at least 5 Celsius (e.g., at least 10 Celsius) below the peak of the Tan Delta/temperature curve. Typically, within the aforementioned Tan Delta range, the material retains its original lens optical design while maintaining only low residual stresses.

There is therefore provided, in accordance with some applications of the present invention, a method for use with a base eyeglasses lens, the method including:

forming an additional lens from an amorphous viscoelastic material, such that the additional lens has an optical design;

changing a curvature of the additional lens such that the curvature of the additional lens conforms with a curvature of the base eyeglasses lens, without causing a loss of the optical design of the additional lens, by:

heating the additional lens to a temperature at which a Tan Delta of the amorphous viscoelastic material is between 0.2 and 0.8; and while the additional lens is at said temperature at which the Tan Delta of the amorphous viscoelastic material is between 0.2 and 0.8, shaping the additional lens, such that the curvature of the additional lens conforms with the curvature of the base eyeglasses lens; and subsequently, adhering the additional lens to the base eyeglasses lens, the optical design of the additional lens being such that, upon being adhered to the base eyeglasses lens, the adhered base eyeglasses lens and the additional lens provide a combined lens having a desired optical prescription.

In some applications, heating the additional lens includes heating the additional lens to a temperature at which a Tan Delta of the amorphous viscoelastic material is between 0.2 and 0.8 and to temperature that is lower than a temperature at which Tan Delta of the amorphous viscoelastic material is at its peak.

In some applications, heating the additional lens includes heating the additional lens to a temperature at which a Tan Delta of the amorphous viscoelastic material is between 0.2 and 0.8 and to a temperature that is at least 5 degrees Celsius below a temperature at which Tan Delta of the amorphous viscoelastic material is at its peak.

In some applications, forming the additional lens from the amorphous viscoelastic material includes forming the additional lens from an amorphous thermoplastic material.

In some applications, heating the additional lens to a temperature at which the Tan Delta of the amorphous viscoelastic material is between 0.2 and 0.8 includes facilitating shaping the additional lens without the additional lens retaining significant internal stresses.

In some applications, the base eyeglasses lens includes a single-focus optically-corrective lens, and adhering the additional lens to the base eyeglasses lens includes forming a combined progressive lens that provides a desired optical prescription.

In some applications, shaping the additional lens includes shaping the additional lens, while the additional lens is at said temperature at which the Tan Delta of the amorphous viscoelastic material is between 0.2 and 0.8, over a time period of between 0.1 seconds and 1 hour.

In some applications, forming the additional lens from the amorphous viscoelastic material such that the additional lens has an optical design includes forming the additional lens from the amorphous viscoelastic material using a forming process selected from the group consisting of: injection molding, injection-compression molding, compression molding, stamping, 3D-printing, casting, and any combination thereof.

In some applications, heating the additional lens to a temperature at which the Tan Delta of the amorphous viscoelastic material is between 0.2 and 0.8 includes heating the additional lens to a temperature at which the Tan Delta of the amorphous viscoelastic material is between 0.3 and 0.8.

In some applications, heating the additional lens to a temperature at which the Tan Delta of the amorphous viscoelastic material is between 0.3 and 0.8 includes heating the additional lens to a temperature at which the Tan Delta of the amorphous viscoelastic material is between 0.5 and 0.8.

In some applications, heating the additional lens to a temperature at which the Tan Delta of the amorphous viscoelastic material is between 0.2 and 0.8 includes heating the additional lens to a temperature at which the Tan Delta of the amorphous viscoelastic material is between 0.2 and 0.5.

In some applications, heating the additional lens to a temperature at which the Tan Delta of the amorphous viscoelastic material is between 0.2 and 0.5 includes heating the additional lens to a temperature at which the Tan Delta of the amorphous viscoelastic material is between 0.2 and 0.3.

In some applications, the additional lens is coated with a functional coating, and changing the curvature of the additional lens such that the curvature of the additional lens conforms with the curvature of the base eyeglasses lens includes changing a curvature of the functional coating without causing a loss of function of the functional coating.

In some applications, changing the curvature of the functional coating without causing a loss of function of the functional coating includes changing a curvature of the functional coating without introducing significant stresses into the additional lens.

In some applications, changing the curvature of the functional coating without causing a loss of function of the functional coating includes changing a curvature of the functional coating without introducing significant stresses into the functional coating.

In some applications, heating the additional lens to a temperature at which the Tan Delta of the amorphous viscoelastic material is between 0.2 and 0.8 includes heating the additional lens to a temperature at which a Tan Delta of a material from which the functional coating is made is between 0.2 and 0.8.

In some applications, the additional lens is coated with a hard coating, and changing the curvature of the functional coating without causing a loss of function of the functional coating includes changing a curvature of the hard coating without introducing significant stresses into the hard coating.

In some applications, the additional lens is coated with a hard coating, and changing the curvature of the functional coating without causing a loss of function of the functional coating includes changing a curvature of the hard coating without introducing significant stresses into the additional lens.

In some applications, the additional lens is coated with a hard coating, and changing the curvature of the functional coating without causing a loss of function of the functional coating includes changing a curvature of the hard coating without cracking the hard coating.

In some applications, the additional lens is coated with a functional coating selected from the group consisting of: a hard coating, an anti-reflective coating, a super-hydrophobic coating, an antistatic coating, a clean coating, a blue-light filter, a reflective coating, an anti-UV coating, a photochromic coating, a polarizing coating, and any combination thereof.

In some applications, shaping the additional lens includes, while the additional lens is at said temperature at which the Tan Delta of the amorphous viscoelastic material is between 0.2 and 0.8, applying pressure of 0.01-100 kg per square cm to the additional lens.

In some applications, shaping the additional lens includes, while the additional lens is at said temperature at which the Tan Delta of the amorphous viscoelastic material is between 0.2 and 0.8, applying pressure of 0.2-1 kg per square cm to the additional lens.

In some applications, shaping the additional lens such that the curvature of the additional lens conforms with the curvature of the base eyeglasses lens includes changing a curvature of the additional lens by more than plus/minus 2 diopters.

In some applications, shaping the additional lens such that the curvature of the additional lens conforms with the curvature of the base eyeglasses lens includes changing a curvature of the additional lens by up to plus/minus 4 diopters.

In some applications, the method further includes, subsequent to adhering the additional lens to the base eyeglasses lens, applying a heat treatment to the additional lens in order to release stresses from the additional lens.

In some applications, the method further includes, subsequent to adhering the additional lens to the base eyeglasses lens, applying a pressure treatment to the combined lens such as to remove any vacant volumes which may be located between the additional lens and the base lens.

In some applications, the method further includes, subsequent to adhering the additional lens to the base eyeglasses lens, applying a pressure treatment to the combined lens such as to remove any air bubbles which may be disposed between the additional lens and the base lens.

In some applications, shaping the additional lens includes, while the additional lens is at said temperature at which the Tan Delta of the amorphous viscoelastic material is between 0.2 and 0.8, pressing the additional lens into a form using a pressure-applying surface that is made of a relatively soft material.

In some applications, shaping the additional lens while the additional lens is at said temperature at which the Tan Delta of the amorphous viscoelastic material is between 0.2 and 0.8 includes directly heating the additional lens via the pressure-applying surface.

In some applications, the pressure-applying surface includes a cushion, and directly heating the additional lens via the pressure-applying surface includes directly heating the additional lens using a heated fluid that is disposed within the cushion.

In some applications, directly heating the additional lens via the pressure-applying surface includes directly heating the additional lens via a spiral heating element that is coupled to the pressure-applying surface.

In some applications, gaps between adjacent windings of the spiral heating element decrease from a center of the spiral toward an outside of the spiral.

In some applications, the pressure-applying surface is made of a material having a hardness of less than 90 Shore A.

In some applications, the pressure-applying surface is made of a material having a hardness of between 20 and 85 Shore A.

There is further provided, in accordance with some applications of the present invention, a method including:

adhering a first lens to a second lens such as to form a combined lens having a given optical design, the adhering including:

placing the first lens and the second lens in respective first and second pressure chambers, with an adhesive layer disposed between the first lens and the second lens, pressure within each of the first and second pressure chambers being independently controllable;

bringing a convex surface of the first lens into contact with the adhesive layer, such that a central region of the convex surface of the first lens initially contacts the adhesive layer, and contact between the convex surface of the first lens and the adhesive layer subsequently radiates outwardly from the central region of the convex surface of the first lens, until the convex surface of the first lens becomes covered by the adhesive layer; and bringing a concave surface of the second lens into contact with the adhesive layer, such that a central region of the concave surface of the second lens initially contacts the adhesive layer, and contact between the concave surface of the second lens and the adhesive layer subsequently radiates outwardly from the central region of the concave surface of the second lens, until the concave surface of the second lens becomes covered by the adhesive layer.

In some applications, the adhering further includes reducing pressure within the first pressure chamber to below ambient pressure while bringing the convex surface of the first lens into contact with the adhesive layer.

In some applications, the adhering further includes reducing pressure within the second pressure chamber to below ambient pressure while bringing the concave surface of the second lens into contact with the adhesive layer.

In some applications, bringing the convex surface of the first lens into contact with the adhesive layer, such that the central region of the convex surface of the first lens first contacts the adhesive layer includes causing the adhesive layer to form a convex curve that faces toward the convex surface of the first lens by applying a pressure difference between the first and second pressure chambers.

In some applications, bringing the concave surface of the second lens into contact with the adhesive layer such that the central region of the concave surface of the second lens first contacts the adhesive layer includes, subsequent to the convex surface of the first lens being covered with the adhesive layer, moving the first lens and the adhesive layer and the second lens toward each other, such that the central region of the convex surface of the first lens with the adhesive layer disposed thereon contacts the central region of the concave surface of the second lens, and a curvature of the convex surface of the first lens is greater than a curvature of the concave surface of the second lens.

In some applications, the method further includes removing any air bubbles that become trapped between the first lens and the adhesive layer using at least one technique selected from the group consisting of: applying air pressure, applying mechanical pressure, autoclaving, and any combination thereof.

In some applications, the method further includes removing any air bubbles that become trapped between the second lens and the adhesive layer using at least one technique selected from the group consisting of: applying air pressure, applying mechanical pressure, autoclaving, and any combination thereof.

In some applications, the method further includes removing any vacant volumes that are located between the first lens and the adhesive layer using at least one technique selected from the group consisting of: applying air pressure, applying mechanical pressure, and any combination thereof.

In some applications, the method further includes removing any vacant volumes that are located between the second lens and the adhesive layer using at least one technique selected from the group consisting of: applying air pressure, applying mechanical pressure, and any combination thereof.

In some applications, a thickness of the adhesive layer is between 20 and 300 microns.

In some applications, the thickness of the adhesive layer is between 50 and 200 microns.

In some applications, the method further includes, at one or more stages during the adhering, heating at least one element selected from the group consisting of: the base lens, the additional lens, the adhesive layer, the first pressure chamber, the second pressure chamber, and any combination thereof.

In some applications, heating the at least one element includes heating the at least one element to a temperature of between 25 and 75 degrees Celsius.

In some applications, heating the at least one element includes heating the at least one element for a time period of 0.1 seconds to 1 hour.

There is further provided, in accordance with some applications of the present invention, apparatus for adhering a first lens having at least one convex surface to a second lens having at least one concave surface, such as to form a combined lens having a given optical design, the apparatus including:

a first pressure chamber configured to house the first lens, and second pressure chamber configured to house the second lens, pressure within each of the first and second pressure chambers being independently controllable;

an adhesive layer disposed between the first and second pressure chambers;

one or more mechanical pushing elements; and a computer processor configured:

to drive one of the mechanical pushing elements to bring the convex surface of the first lens into contact with the adhesive layer, such that a central region of the convex surface of the first lens initially contacts the adhesive layer, and contact between the convex surface of the first lens and the adhesive layer subsequently radiates outwardly from the central region of the convex surface of the first lens, until the convex surface of the first lens becomes covered by the adhesive layer; and to drive one of the mechanical pushing elements to bring the concave surface of the second lens into contact with the adhesive layer, such that a central region of the concave surface of the second lens initially contacts the adhesive layer, and contact between the concave surface of the second lens and the adhesive layer subsequently radiates outwardly from the central region of the concave surface of the second lens, until the concave surface of the second lens becomes covered by the adhesive layer.

In some applications, the computer processor is configured to reduce the pressure within the first pressure chamber to below ambient pressure while driving one of the mechanical pushing elements to bring the convex surface of the first lens into contact with the adhesive layer.

In some applications, the computer processor is configured to reduce the pressure within the second pressure chamber to below ambient pressure while driving one of the mechanical pushing elements to bring the concave surface of the second lens into contact with the adhesive layer.

In some applications, the computer processor is configured to cause the adhesive layer to form a convex curve that faces toward the convex surface of the first lens by applying a pressure difference between the first and second pressure chambers.

In some applications, the apparatus is for use with a first lens and a second lens that are shaped such that a curvature of the convex surface of the first lens is greater than a curvature of the concave surface of the second lens, and the computer processor is configured, subsequent to the convex surface of the first lens being covered with the adhesive layer, to move the first lens and the adhesive layer and the second lens toward each other, such that the central region of the convex surface of the first lens with the adhesive layer disposed thereon contacts the central region of the concave surface of the second lens.

In some applications, the computer processor is configured to remove any air bubbles that become trapped between the first lens and the adhesive layer and any vacant volumes that are disposed between the first lens and the adhesive layer, by applying air pressure within the first pressure chamber.

In some applications, the computer processor is configured to remove any air bubbles that become trapped between the second lens and the adhesive layer and any vacant volumes that are disposed between the second lens and the adhesive layer, by applying air pressure within the second pressure chamber.

In some applications, the one or more mechanical pushing elements are configured to remove any air bubbles that become trapped between the first lens and the adhesive layer and any vacant volumes that are disposed between the first lens and the adhesive layer, by applying mechanical pressure.

In some applications, the one or more mechanical pushing elements are configured to remove any air bubbles that become trapped between the second lens and the adhesive layer and any vacant volumes that are disposed between the second lens and the adhesive layer, by applying mechanical pressure.

In some applications, the apparatus further includes a heating and/or pressure chamber that is configured to remove any air bubbles that become trapped between the additional lens and the adhesive layer, any air bubbles that become trapped between the second lens and the adhesive layer, any vacant volumes that are disposed between the first lens and the adhesive layer, and any vacant volumes that are disposed between the second lens and the adhesive layer.

In some applications, a thickness of the adhesive layer is between 20 and 300 microns.

In some applications, the thickness of the adhesive layer is between 50 and 200 microns.

In some applications, the apparatus further includes a heating component that is configured, at one or more stages during the adhering, to heat at least one element selected from the group consisting of: the base lens, the additional lens, the adhesive layer, the first pressure chamber, the second pressure chamber, and any combination thereof.

In some applications, the heating component is configured to heat the at least one element to a temperature of between 25 and 75 degrees Celsius.

In some applications, the heating component is configured to heat the at least one element for a time period of 0.1 seconds to 1 hour.

In some applications, at least one of the mechanical pushing elements is made of a material having a hardness of less than 90 Shore A.

In some applications, the at least one of the mechanical pushing elements is made of a material having a hardness of between 20 and 85 Shore A.

The present invention will be more fully understood from the following detailed description of embodiments thereof, taken together with the drawings, in which:

DETAILED DESCRIPTION OF EMBODIMENTS

Figure 1:
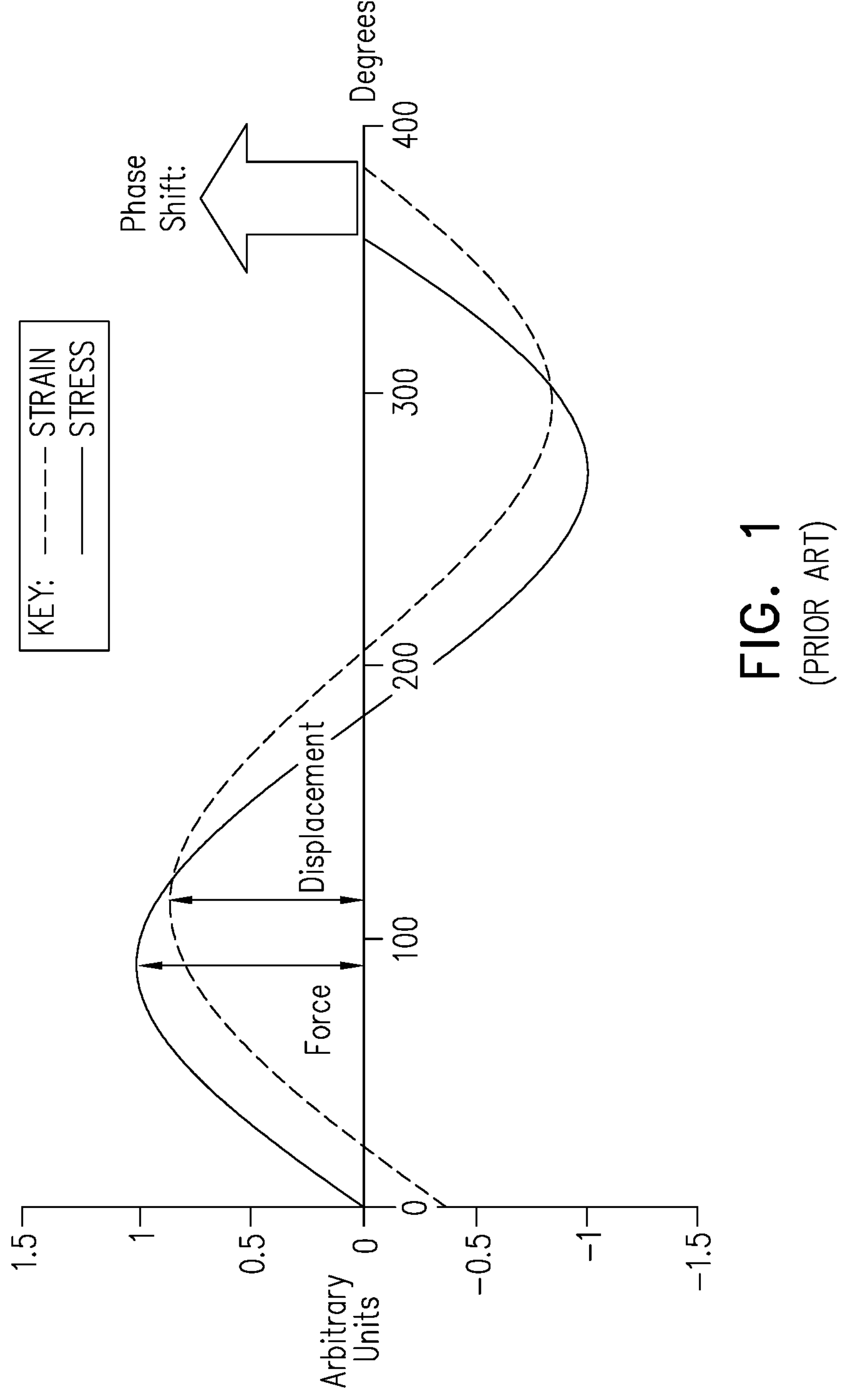
FIG. 1 is a graph showing stress-versus-time and strain-versus-time curves for a viscoelastic material loaded by a sinusoidal load and responding with a delayed sinusoidal displacement, as is known in the prior art and as described hereinabove in the Background section.
Figure 2:
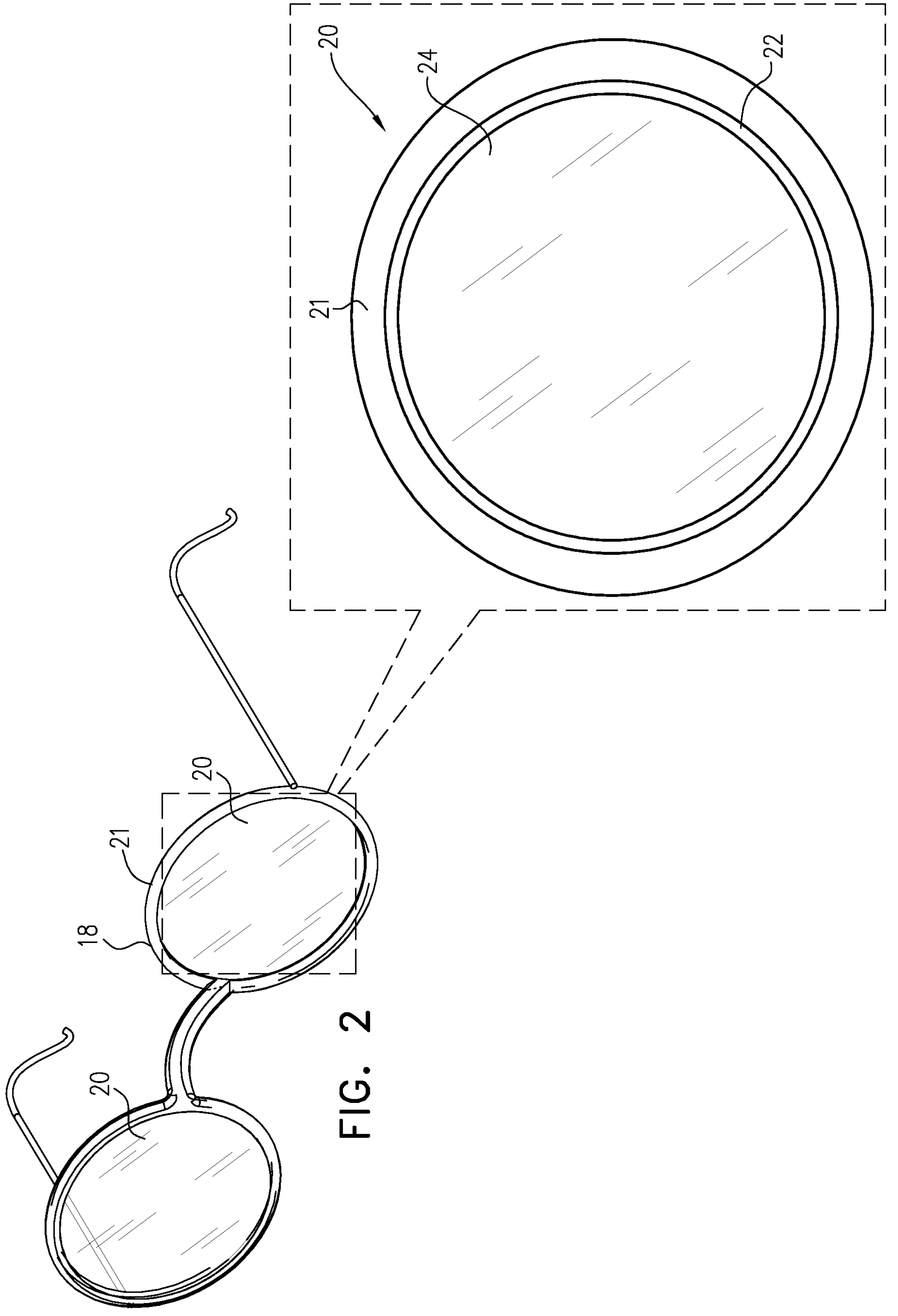
FIG. 2 is a schematic illustration of a pair of glasses that contains one or more lenses that are made up of a base lens and an additional lens adhered to the base lens, in accordance with some applications of the present invention.

Reference is now made to FIG. 2, which is a schematic illustration of a pair of glasses 18 that includes one or more combined lenses 20 within a glasses frame 21, the combined lenses being made up of a base lens 22 and an additional lens 24 adhered to the base lens, in accordance with some applications of the present invention. For some applications, combined lens 20 is a progressive lens, with base lens 22 being a single-focus, corrective lens (e.g., a far-vision corrective lens) and the optical design of the additional lens 24 being such that upon being adhered to the base lens 22, combined lens 20 becomes a progressive lens that matches a desired prescription. Typically, additional lens 24 is coupled to the inner surface of base lens 22 (i.e., the surface of base lens 22 that is closer to the user's eyes when combined lens 20 is incorporated into glasses that are worn by the user, and which is typically concave). Alternatively, additional lens 24 is coupled to the outer surface of base lens 22 (i.e., the surface of base lens 22 that is farther from the user's eyes when the combined lens 20 is incorporated into glasses that are worn by the user, and which is typically convex). It is noted that, in the enlarged portion of FIG. 1, a gap is shown between the outer edge of the additional lens and glasses frame 21. Typically, such a gap would not exist in practice, and such a gap is only shown in FIG. 1 for illustrative purposes, in order to show additional lens 24 and base lens 22.

Although some applications of the present invention are described with reference to the above example (wherein base lens 22 is a single-focus, corrective lens (e.g., a far-vision corrective lens) and the optical design of the additional lens 24 is such that upon being adhered to base lens 22, combined lens 20 becomes a progressive lens that matches a desired prescription), the scope of the present application includes applying the lens-shaping techniques described herein to other combinations of base lens 22 and additional lens 24. For example, the lens-shaping techniques described herein could be applied to an additional lens that provides certain optical functionalities (e.g., polarization, single-focus additive prescription, etc.) and that is configured to be adhered to a base lens that has progressive characteristics. Alternatively, the lens-shaping techniques described herein are applied to an additional lens that is configured to be added to a base lens having characteristics that are not optically-corrective, for example, a lens of safety goggles or swimming goggles. For some applications, the lens-shaping techniques described herein are applied to a plano additional lens that is coated with a functional coating, such as any one of the functional coatings described hereinbelow. Alternatively, the lens-shaping techniques described herein are applied to an additional lens that provides optical functionalities (e.g., single-focus optically-corrective functionality, progressive optically-corrective functionality, etc.) and that is configured to be adhered to a base lens that provides protection from the sun (e.g., UV protection and/or polarization). Moreover, although some applications of the lens-shaping techniques are described herein with reference to an additional lens, the scope of the present application includes applying the shaping processes described herein to any ophthalmic lens having a lens design. As described in further detail hereinbelow, typically, the techniques described herein are configured to facilitate reshaping of an ophthalmic lens, such that the lens not only retains its optical design at predesignated, clinically important sub-areas to within ISO standard after being reshaped and adhered to base lens 22, but also retains approximately the same residual cylinder quantities at predesignated, clinically important sub-areas of the lens. Further typically, retention by the lens of its original optical design to within tolerance at the predesignated sub-areas of the lens is achieved without the ophthalmic lens retaining significant internal stresses (of the type that could lead to the additional lens rupturing, or undergoing a stress crack during its lifetime). Further details are described hereinbelow with reference to FIGS. 5A and 5B, regarding retention by the lens of its original optical design to within tolerance at predesignated sub-areas of the lens.

Figure 3A:
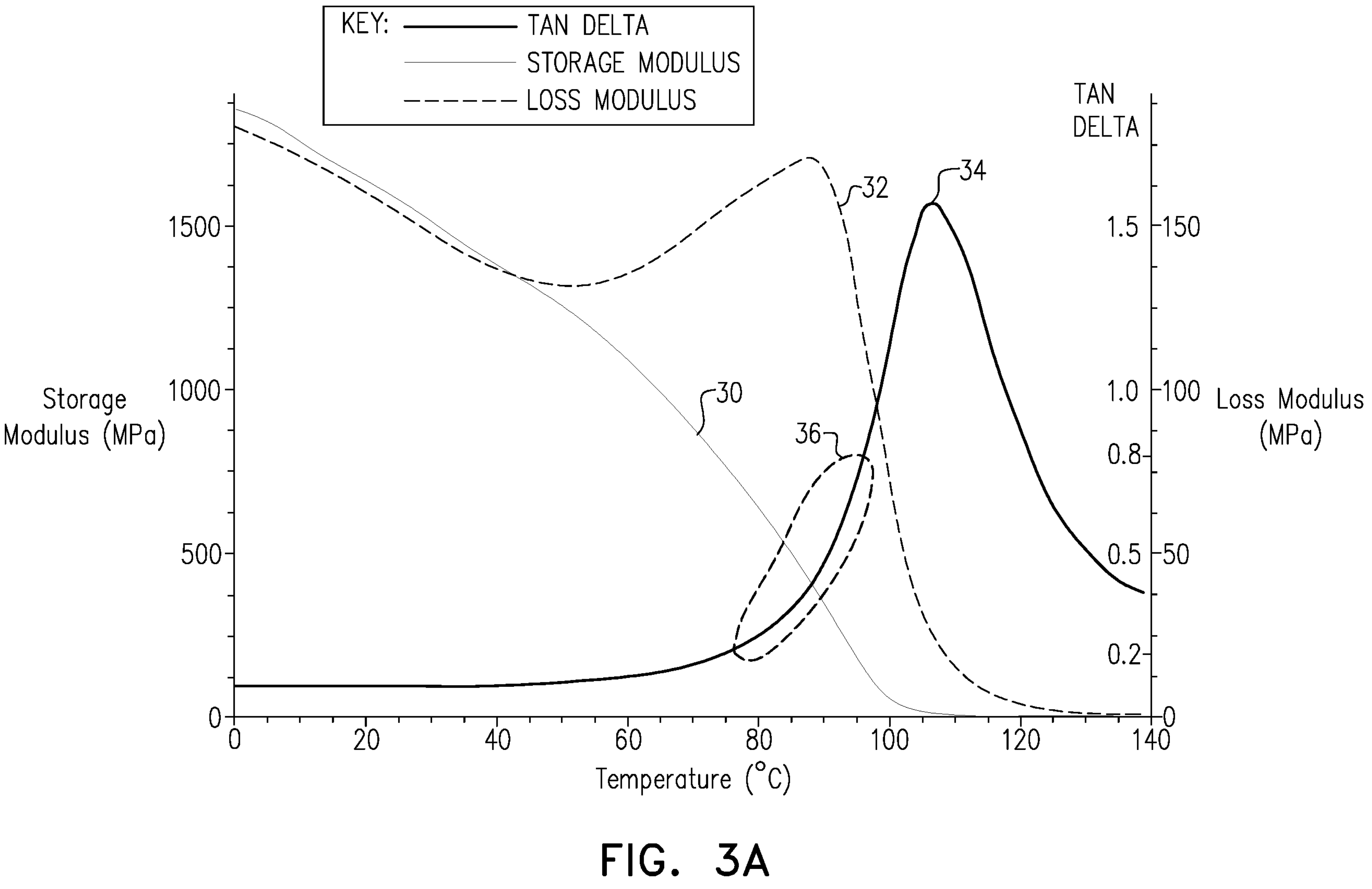
FIGS. 3A and 3B are graphs showing the variation, with temperature, of the storage modulus, the loss modulus, and the Tan Delta of respective typical materials from which an additional lens is made, in accordance with some applications of the present invention.
Figure 3B:
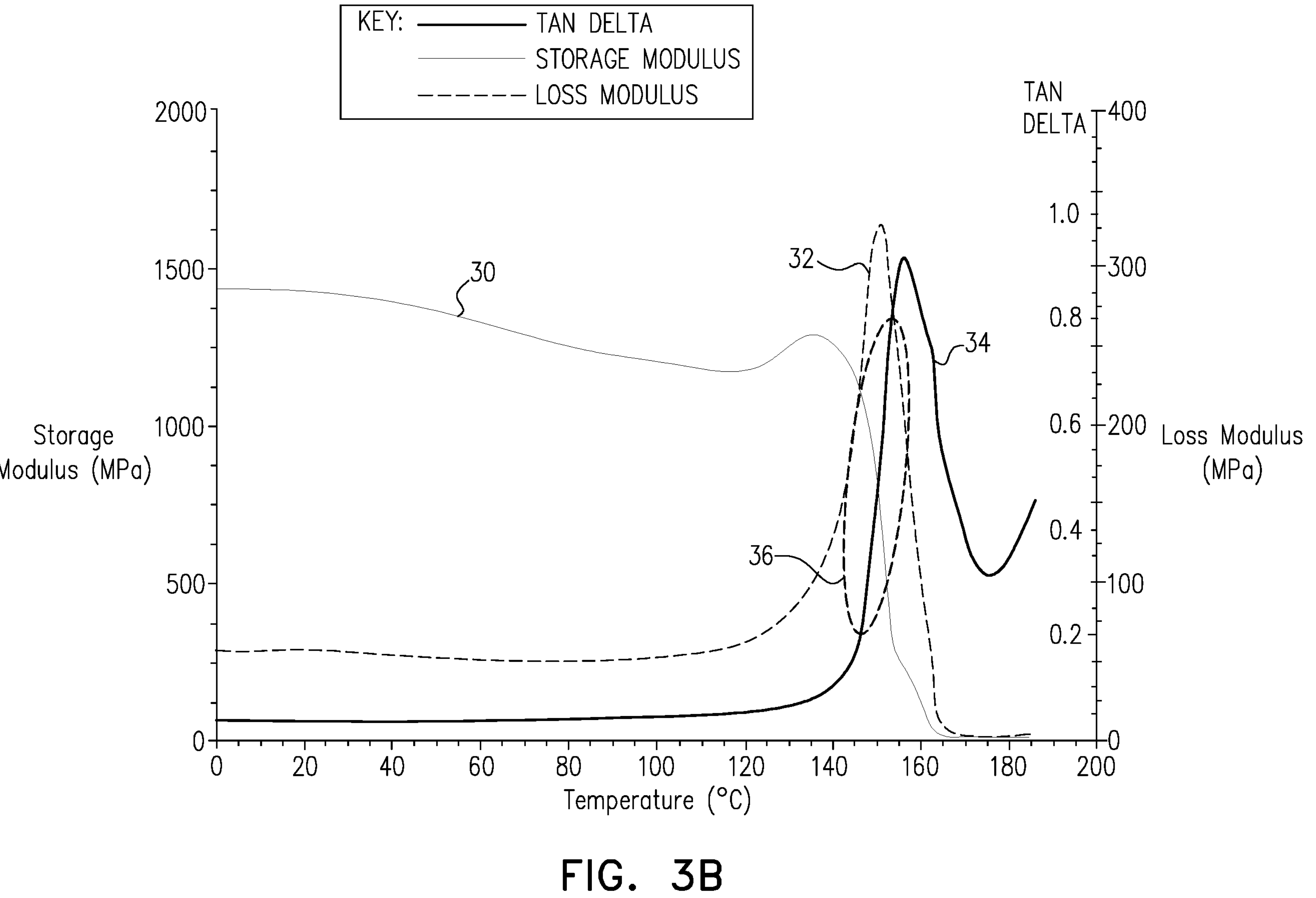

Reference is now made to FIGS. 3A and 3B, which are graphs showing the variation with temperature of the storage modulus (curve 30), the loss modulus (curve 32), and the Tan Delta (curve 34) of typical materials from which additional lens 24 is made, in accordance with some applications of the present invention. Typically, additional lens 24 is made of an amorphous viscoelastic polymer (e.g., an amorphous thermoplastic polymer), which exhibits both elastic and plastic properties. Further typically, the additional lens is made of a polymer from the Polymethyl Methacrylate (PMMA) group of homopolymers and copolymers, e.g., an impact-modified PMMA polymer. Still further typically, the material from which the additional lens is made is selected such that within the full range of ambient temperatures to which the additional lens is likely to be exposed during use of combined lens 20, the additional lens maintains its optical design. Thus, typically, the material is a material that does not undergo changes to shape or cracking within a temperature range −10 degrees Celsius to 60 degrees Celsius.

The curves shown in FIG. 3A were measured upon Polymethyl methacrylate (PMMA), using Dynamic Mechanical Analysis (also known as "DMA analysis") according to ASTM designation number D 5023 (Standard Test Method for Plastics: Dynamic Mechanical Properties: In Flexure (Three-Point Bending), with the analysis being performed using a TGA Q800 TA instrument, within a temperature range of 0-200° C. For some applications, the additional lens is made of a polycarbonate polymer. The curves shown in FIG. 3B were also measured upon a polycarbonate lens using Dynamic Mechanical Analysis according to ASTM designation number D 5023 (Standard Test Method for Plastics: Dynamic Mechanical Properties: In Flexure (Three-Point Bending), with the analysis being performed using a TGA Q800 TA instrument, within a temperature range of 0-200° C.

The shapes of the curves shown in FIGS. 3A and 3B are for specific examples of amorphous viscoelastic polymers, which are used in accordance with some applications of the present invention. However, the scope of the present application includes using any amorphous viscoelastic polymer (e.g., any amorphous thermoplastic polymer, and/or any PMMA polymer, polycarbonate polymer, polyurethane, and/or cyclic olefin polymer), and applying the lens-shaping techniques described herein. The other polymers that are used have different storage modulus, loss modulus, and Tan Delta curves to those shown in FIGS. 3A and 3B. However, the general principles described with reference to FIGS. 3A and 3B are applicable to other amorphous viscoelastic polymers. As such, the general principles of the lens-shaping techniques described herein are typically applied to other amorphous viscoelastic polymers, but using appropriate temperatures for those materials.

As described hereinabove in the Background section, a viscoelastic material's response to the application of mechanical energy to the material may be characterized by its storage modulus (E') and its loss modulus (E"). The material's storage modulus is a measure of its elastic behavior, i.e., the extent to which mechanical energy that is applied to the material is stored in bond stretching along polymer chains, such as to be released during recovery. Loss modulus is a measure of the material's plastic behavior, i.e., the extent to which mechanical energy that is applied to the material is lost due to internal friction between polymer chains (such energy not being stored and subsequently released). A further parameter, which is known as the Tan Delta of the material, measures the ratio of the loss modulus to the storage modulus, at any temperature. As such, a material's Tan Delta is a measure of the tendency of the material to be dissipative and dimensionally unstable. Typically, all three of the aforementioned parameters (i.e., storage modulus, loss modulus, and Tan Delta) vary as the material's temperature varies, as indicated by curves 30, 32, and 34 of FIG. 3A. The aforementioned parameters are determined by analyzing the material using Dynamic Mechanical Analysis (also known as "DMA analysis"), as described above.

Typically, additional lens 24 is initially formed such as to exhibit a given lens optical design, in accordance with the needs described hereinabove (e.g., such that, upon being adhered to base lens 22, the combination of the base lens and the additional lens forms a progressive lens). For example, the additional lens may initially be formed using a forming process such as injection molding, injection-compression molding, compression molding, stamping, 3D-printing, and/or casting. In order to adhere additional lens 24 to base lens 22, it is typically desirable that the additional lens undergo a further shaping procedure such that its curvature conforms with the curvature of the base lens. In particular, the surface of the additional lens that is adhered to the base lens needs to be shaped to conform with the surface of the base lens to which it is adhered. It is noted that, in some cases, the curvature of the additional lens is made to be slightly greater than that of the base lens, in order to facilitate an adhesion process described hereinbelow with reference to FIGS. 7A-D. Furthermore, it is noted that, in some cases, and in particular if the curvatures of the additional lens and the base lens are similar to each other, it is not necessary to shape the additional lens prior to the adhesion step. However, the inventors have found that a significant proportion of combinations of additional and base lenses typically require a shaping technique as described herein to be durably applied to the additional lens. This is particularly the case when the ophthalmic prescription includes cylinder with associated cylinder axis values, which tends to have an impact on the concave curvature of the base lens.

An alternative to reshaping the additional lens such that its curvature conforms with the curvature of the base lens would be to initially shape the additional lens such that it has the desired optical design and is also shaped to conform with the shape of the base lens. However, this would greatly increase the number of additional lenses that would need to be stocked by a retailer or optical laboratory, since it would be necessary to stock separate stock-keeping units of additional lenses having a given optical design but having different curvatures, such as to conform with respective differently-shaped base lenses. (As noted above, this is particularly the case when the ophthalmic prescription includes cylinder with associated cylinder axis values, which tends to have an impact on the concave curvature of the base lens.) Alternatively, this would mean that additional lenses would have to be manufactured in a bespoke manner (based upon a patient's optical requirements and choice of base lens), in which case many of the advantages of manufacturing a progressive lens using a base lens and an additional lens, rather than using traditional manufacturing techniques, would be lost.

Lens shaping is highly challenging due to the fact that the predesignated sub-areas of the lens are very accurate (at a level of thickness difference of microns). Shaping a progressive lens in an uncontrolled manner risks ruining the optical value of the lens. It is desirable that, after the additional lens is shaped in the above-described manner, the additional lens not only retains its optical design at predesignated, clinically important sub-areas to within ISO standard after being reshaped and adhered to base lens 22, but also retains approximately the same residual cylinder quantities at predesignated, clinically important sub-areas of the lens. Further typically, it is desirable that the retention by the lens of its original optical design to within tolerance at the predesignated sub-areas of the lens be achieved without the ophthalmic lens retaining significant internal stresses (of the type that could lead to the additional lens rupturing, or undergoing a stress crack during its lifetime). (Details of the levels of tolerance to which the additional lens should retain its original optical design at predesignated sub-areas of the lens are described in further detail hereinbelow, with reference to FIGS. 9A-B.) Based upon the aforementioned considerations, subsequent to the initial forming of the additional lens, a lens-shaping process as described herein is typically applied to additional lens 24.

For some applications, by applying the lens-shaping process described herein, the curvature of the additional lens may be changed by more than plus/minus 1 diopters (e.g., more than plus/minus 2 diopters), and/or up to plus/minus 4 diopters (e.g., up to plus/minus 3 diopters), while retaining the lens optical design and without introducing significant stresses into the lens (as described above).

Referring again to FIGS. 3A and 3B, as noted above, curve 30 shows the variation of the storage modulus with temperature, and curve 32 shows the variation of the loss modulus with temperature. It is again noted that the curves as shown in FIGS. 3A and 3B correspond to the storage modulus, loss modulus, and Tan Delta of specific examples of the material from which the additional lens may be made. However, the general principles described with reference to FIGS. 3A and 3B are typically applicable to any amorphous viscoelastic polymer from which the additional lens may be made.

As noted above, the Tan Delta is the ratio between the loss modulus and the storage modulus. Referring first to FIG. 3A, curve 34, which shows the variation of Tan Delta with temperature, rises sharply, before reaching a peak and then dropping sharply. Similarly, referring to FIG. 3B, it may be observed that curve 34, which shows the variation of Tan Delta with temperature, rises sharply, before reaching a peak and then dropping sharply. The materials that are typically used in the additional lens typically have only a single peak in their Tan Delta/temperature curve, as shown.

The inventors of the present application have found that, if additional lens 24 is shaped at temperatures at which the Tan Delta is greater than 0.8 (or in some cases greater than 0.5 or 0.3), this typically causes irreversible damage to the lens optical design. This is because when the lens is shaped under stress at such temperatures, deformation of the lens typically causes plastic deformation, such that when the lens returns to ambient temperature, components of its optical design are lost, and unwanted cylinder may appear. On the other hand, the inventors have found that, if additional lens 24 is shaped at temperatures at which the Tan Delta is below 0.2 (or in some cases below 0.3 or 0.5), this allows the additional lens to retain its lens optical design, but leaves internal stresses in the lens that later may develop into cracks, or regions in which the lens loses its transparency due to stresses. For example, the lens may form cracks as a result of the internal stress in combination with thermal cycles, thermal shocks, mechanical shock, or environmental stress (e.g., due to chemical cleaning materials, and/or or bodily-secreted fluids). The phenomenon of slow cracking of polymers, especially amorphous ones, is well known and is further accelerated by fats (e.g., human fat or grease, from hands or face), oils, cleaning agents and soaps, that are likely to come into contact with the additional lens during its life cycle. An additional risk associated with shaping the additional lens at temperatures at which the Tan Delta is below 0.2 (and in some cases below 0.5, or below 0.3) is that the additional lens will tend to revert to its original shape, which will cause it to become separated from the base lens.

Therefore, in accordance with some applications of the present invention, additional lens 24 is shaped at a temperature at which the material from which the additional lens is made has a Tan Delta of more than 0.2 and/or less than 0.8. For some applications, the additional lens is shaped at a temperature at which the material from which the additional lens is made has a Tan Delta of 0.2-0.5 or 0.2-0.3. Alternatively or additionally, the additional lens is shaped at a temperature at which the material from which the additional lens is made has a Tan Delta of 0.3-0.8 or 0.5-0.8.

It is noted that the material's Tan Delta is typically within the aforementioned range both within the sharp rising portion of the Tan Delta/temperature curve and within the sharp falling portion of the Tan Delta/temperature curve. The material is typically heated to a temperature at which the material's Tan Delta/temperature is within the aforementioned range within the rising portion of the Tan Delta/temperature curve, i.e., at a lower temperature than the temperature at which the Tan Delta/temperature curve first passes 0.8 (e.g., first passes 0.5, or first passes 0.3). In other words, additional lens 24 is typically shaped at a temperature (a) that is below the peak of the Tan Delta/temperature curve of the material from which the additional lens is made, and (b) at which the material from which the additional lens is made has a Tan Delta of more than 0.2 and/or less than 0.8, e.g., 0.2-0.8, 0.2-0.5, 0.2-0.3, 0.3-0.8, or 0.5-0.8. Typically, within the aforementioned Tan Delta range, the material retains its original lens optical design while maintaining only low residual stresses.

For some applications, the additional lens is heated to a temperature within the aforementioned range that is additionally at least 5 degrees Celsius (e.g., at least 10 degrees Celsius) below the peak of the Tan Delta/temperature curve of the material from which the additional lens is made. In other words, additional lens 24 is typically shaped at a temperature (a) that is at least 5 degrees Celsius (e.g., at least 10 degrees Celsius) below the peak of the Tan Delta/temperature curve of the material from which the additional lens is made, and (b) at which the material from which the additional lens is made has a Tan Delta of more than 0.2 and/or less than 0.8, e.g., 0.2-0.8, 0.2-0.5, 0.2-0.3, 0.3-0.8, or 0.5-0.8. Typically, within the aforementioned Tan Delta range, the material retains its original lens optical design while maintaining only low residual stresses.

It is noted that, while the temperature to which the additional lens is heated is constrained by the above-described limitations, the actual value of the Tan Delta at the peak of the Tan Delta/temperature curve is not a constraint. In other words, the additional lens is typically heated to a temperature at which the material from which the additional lens is made has a Tan Delta of more than 0.2 and/or less than 0.8, irrespective of the value of the Tan Delta at the peak of the Tan Delta/temperature curve.

Figure 4:
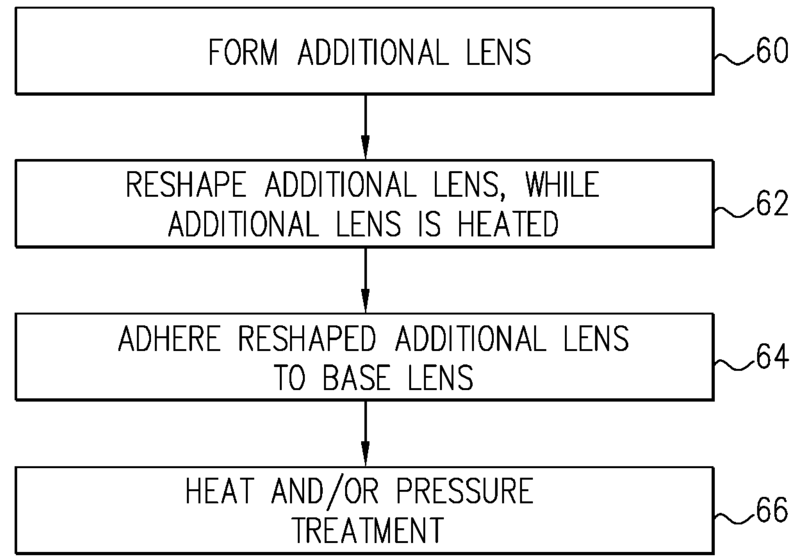
FIG. 4 is a flowchart summarizing steps that are typically performed in accordance with some applications of the present invention.

Reference is now made to FIG. 4, which is a flowchart summarizing steps that are typically performed in order to combine additional lens 24 and base lens 22 (both of which are shown in FIG. 2, for example), in accordance with some applications of the present invention.

In a first step 60, additional lens 24 is formed such as to exhibit a given lens optical design, in accordance with the needs described hereinabove (e.g., such that, upon being adhered to base lens 22, the combination of the base lens and the additional lens forms a progressive lens). For example, the additional lens may initially be formed using a forming process such as injection molding, injection-compression molding, compression molding, stamping, 3D-printing, and/or casting.

In a second step 62, the additional lens is reshaped by applying pressure to the additional lens over a certain period of time (as described in further detail hereinbelow), such that the curvature of the additional lens conforms with the curvature of base lens 22. Typically, during this step, the additional lens is heated to a temperature as described hereinabove. That is to say that, typically, during this step, the additional lens is heated to a temperature at which the material from which the additional lens is made has a Tan Delta of more than 0.2 and/or less than 0.8, e.g., 0.2-0.8, 0.2-0.5, 0.2-0.3, 0.3-0.8, or 0.5-0.8. Further typically, during this step, the additional lens is heated to a temperature (a) that is below the peak of the Tan Delta/temperature curve of the material from which the additional lens is made, and (b) at which the material from which the additional lens is made has a Tan Delta of more than 0.2 and/or less than 0.8, e.g., 0.2-0.8, 0.2-0.5, 0.2-0.3, 0.3-0.8, or 0.5-0.8. Still further typically, during this step, the additional lens is heated to a temperature (a) that is at least 5 degrees Celsius (e.g., at least 10 degrees Celsius) below the peak of the Tan Delta/temperature curve of the material from which the additional lens is made, and (b) at which the material from which the additional lens is made has a Tan Delta of more than 0.2 and/or less than 0.8, e.g., 0.2-0.8, 0.2-0.5, 0.2-0.3, 0.3-0.8, or 0.5-0.8. As described hereinabove, within the aforementioned Tan Delta range, the material from which the additional lens is made typically retains its original lens optical design while maintaining only low residual stresses.

Figure 5:
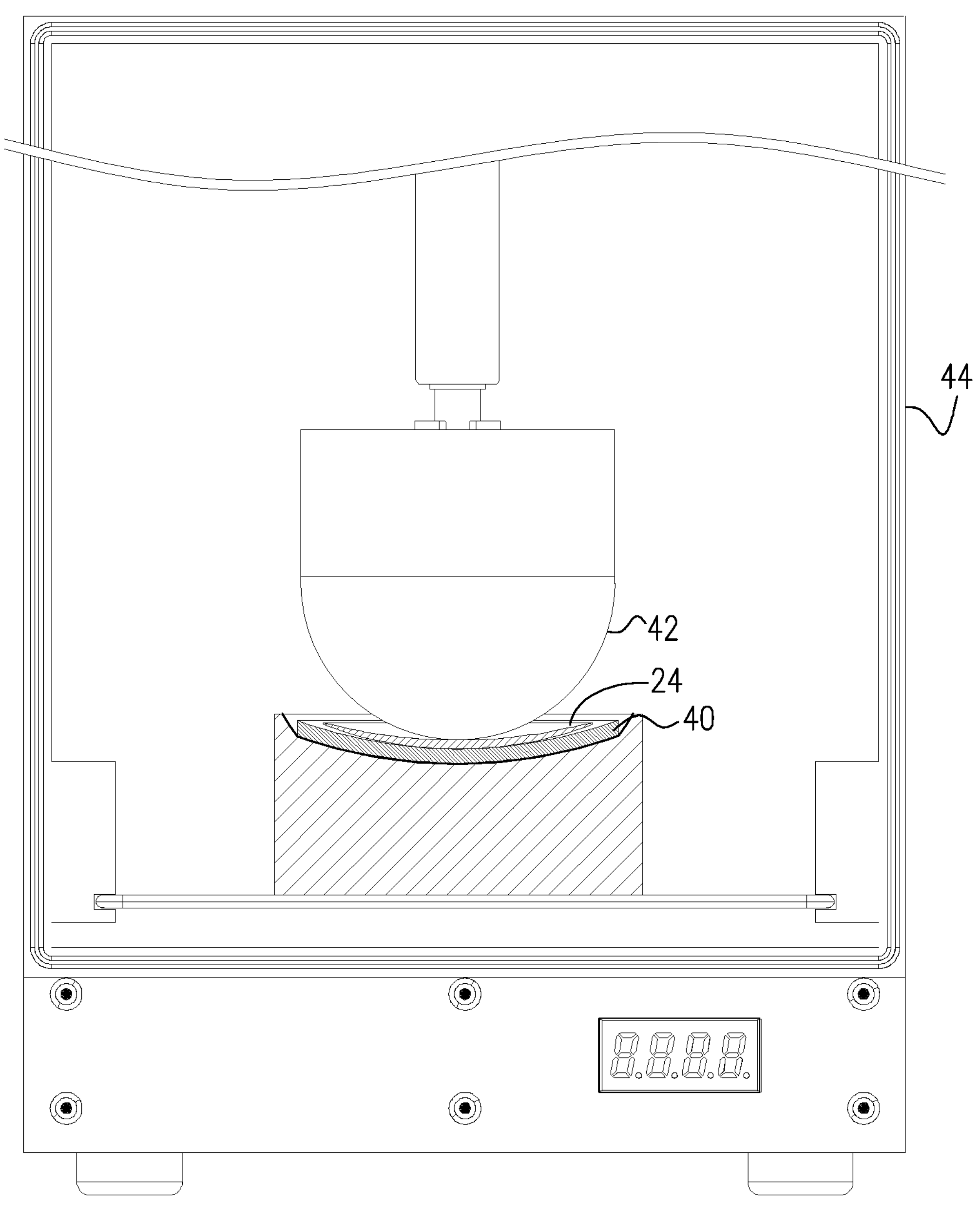
FIGS. 5 and 6 are schematic illustrations of apparatus for shaping a lens while the lens is heated to a given temperature, in accordance with some applications of the present invention.
Figure 6:
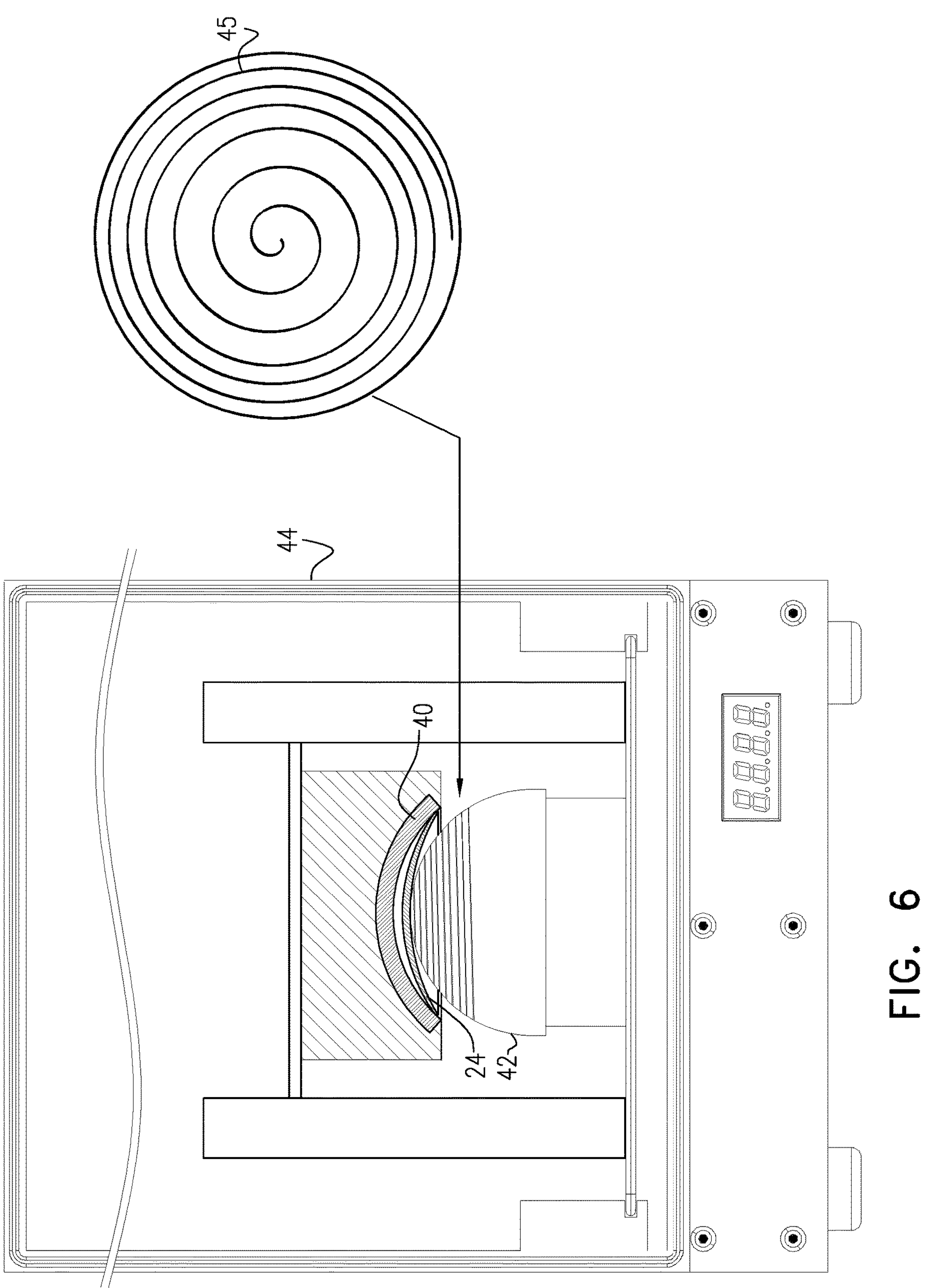

Step 62 is described in further detail hereinbelow with reference to FIGS. 5 and 6. For some applications, while the additional lens is heated to the aforementioned temperature range, the additional lens is pressed into a form 40 (e.g., a mold, as shown in FIGS. 5 and 6), e.g., using a pressure-applying element 42 (also shown in FIGS. 5 and 6) that is typically made of a soft material. For some applications, base lens 22 itself is used as the form. For some applications, the form and the pressure-applying element are disposed inside an oven 44 (also shown in FIGS. 5 and 6), within which the additional lens is heated to the above-described temperature range. It is noted that, in some cases, the curvature of the additional lens is reshaped to be slightly greater than that of the base lens, in order to facilitate an adhesion process described hereinbelow with reference to FIGS. 7A-D. Furthermore, it is noted that, in some cases, and in particular if the curvatures of the additional lens and the base lens are similar to each other, it is not necessary to shape the additional lens prior to the adhesion step. However, the inventors have found that a significant proportion of combinations of additional and base lenses typically require a shaping technique as described herein to be applied to the additional lens.

In a third step 64, once the additional lens has been reshaped, it is adhered to the base lens, for example, using a pressure-sensitive adhesive, a photo-curable liquid adhesive, a photo-curable, pressure-sensitive adhesive, and/or a different adhesive. Step 64 is described in further detail hereinbelow with reference to FIGS. 7A-D.

For some applications, an optional fourth step 66 is applied. For such applications, after the additional lens is adhered to the base lens, the combined lens is subject to an additional heat treatment, in order to further remove any residual stresses that may be present in the additional lens, and/or the overall combined structure. Alternatively or additionally, pressure is applied to the combined structure, in order to ensure that the additional lens and the base lens are fully in contact with one another without any spaces or air bubbles in between. Step 66 is described in further detail hereinbelow, with reference to FIG. 8.

Reference is now made to FIG. 5, which is a schematic illustration of additional lens 24 being shaped, while being heated to a temperature at which the material from which the additional lens is made has a Tan Delta of more than 0.2 and/or less than 0.8, in accordance with some applications of the present invention. As described hereinabove, typically, additional lens 24 is initially formed such as to exhibit a given lens optical design, in accordance with the needs described hereinabove (e.g., such that, upon being adhered to base lens 22 (shown in FIG. 2), the combination of the base lens and the additional lens forms a progressive lens). For example, the additional lens may initially be formed using a forming process such as injection molding, injection-compression molding, compression molding, stamping, 3D-printing, and/or casting. In order to adhere additional lens 24 to base lens 22, the additional lens typically needs to undergo a further shaping procedure such that its curvature conforms with the curvature of the base lens.

For some applications, while additional lens 24 is heated to a temperature that falls within the temperature range described hereinabove, the further shaping process is applied to the additional lens, such that the curvature of the additional lens conforms with the curvature of base lens 22 (which may be an aspheric lens). For some applications, the further shaping process includes pressing the additional lens into a form 40 (such as a mold), e.g., using a pressure-applying element 42 that is typically made of a soft material. Typically, the soft material is an elastomer having a hardness of less than 90 Shore A (e.g., between 20 and 85 Shore A). Alternatively or additionally, the soft material is a plastic, an elastomeric foam, a cellular plastic, a cellular elastomer, a liquid-filled pouch, a gas-filled pouch, a multilayer or monolayer, and/or a gel. For some applications, the soft material is one or more of silicone elastomer, polyurethane elastomer, a thermoplastic elastomer, a vulcanized elastomer and/or a thermoplastic vulcanizate (TPV). For some applications, the pressure-applying element is a dome-shaped cushion that comprises one or more of the aforementioned materials. For some applications, the cushion has an alternative shape. For some applications (not shown), base lens 22 itself (shown in FIG. 2) is used as the form.

For some applications, the form and the pressure-applying element are disposed inside an oven 44, within which the additional lens is heated to a temperature that falls within the temperature range described hereinabove. For some applications, the curvature of the additional lens is made to be slightly greater than that of the base lens, in order to facilitate an adhesion process described hereinbelow with reference to FIGS. 7A-D. As noted above, in some cases, and in particular if the curvatures of the additional lens and the base lens are similar to each other, it is not necessary to shape the additional lens prior to the adhesion step. However, the inventors have found that a significant proportion of combinations of additional and base lenses typically require a shaping technique as described herein to be applied to the additional lens.

Typically, pressure that is applied to the additional lens during the shaping process is more than 0.01 kg per square cm (e.g., more than 0.2 kg per square cm), and/or less than 100 kg per square cm (e.g., less than 1 kg per square cm), e.g., 0.01-100 kg per square cm, or 0.2-1 kg per square cm. Typically, applying pressure that is lower than the aforementioned range will not be sufficient to cause reshaping of the lens, whereas applying pressure that is greater than the aforementioned range can cause damage to the lens (and/or a coating on the lens, such as those described hereinbelow). For some applications, the heating and pressure is applied to the additional lens for a duration of more than 0.1 second, and/or less than 1 hour, e.g., 0.1 second-1 hour. Typically, applying pressure for a time period that is below the aforementioned range will not be sufficient to cause reshaping of the lens, whereas applying pressure for a time period that is greater than the aforementioned range can cause a loss of the optical design of the lens (e.g., due to creep).

It is noted that because the reshaping of the lens is performed at a temperature that is below the peak of the Tan Delta curve, in some cases, the shape of the additional lens slightly reverts to its original shape even after the above-described process has been performed. Typically, even in such cases, the subsequent steps of the procedure described hereinbelow (such as the adhesion process described with reference to FIGS. 7A-D) ensure that the additional lens conforms with the shape of the base lens in a durable manner.

Typically, subsequent to the shaping process, the lens is cooled before being removed from the form (e.g., the mold) in which it is placed during the shaping process. Once the additional lens has been shaped, it is adhered to the base lens, for example, using a pressure-sensitive adhesive, a photo-curable liquid adhesive, a photo-curable, pressure-sensitive adhesive, and/or a different adhesive. For some applications, the additional lens is adhered to the base lens using the adhesion procedure described hereinbelow with reference to FIGS. 7A-D. It is noted that, since the additional lens is reshaped prior to adhering the additional lens to the base lens, the characteristics of the reshaped additional lens may be tested prior to the additional lens being adhered to the base lens. This being the case, in the event that the reshaping process is discovered to have reduced the fidelity of the optical design of a particular additional lens beyond the requisite tolerance levels, then the additional lens can be rejected from being used without causing the base lens to also be rejected from being used.

For some applications, the additional lens is coated with a functional coating, such as a hard coating, an anti-reflective coating, a super-hydrophobic coating, an antistatic coating, a clean coating (i.e., a coating configured to repel liquids, dust, etc.), a blue-light filter, a reflective coating, an anti-UV coating, aphotochromic coating, apolarizing coating and/or any combination thereof. In accordance with respective applications, the coating is applied to the additional lens in liquid, gas, and/or solid form, typically using techniques that are known in the art. Typically, the coating is applied to the additional lens before the shaping process is applied to the additional lens, and the material from which the coating is made is selected such that when the additional lens is heated to the above-described temperature range and the shaping process is applied to the additional lens, the coating also becomes deformable in a manner that does not cause a loss of function of the functional coating, and that does not introduce significant stresses to the coating (of the type that could lead to the coating rupturing, or undergoing a stress crack during its lifetime), or cause the coating to introduce significant stresses to the additional lens itself (of the type that could lead to the additional lens rupturing, or undergoing a stress crack during its lifetime). Thus, the curvature of the functional coating can also be changed without causing a loss of function of the functional coating. For some applications, the temperature to which the additional lens is heated is such that, at this temperature, the Tan Delta of the material from which the functional coating is made is more than 0.2 and/or less than 0.8, e.g., 0.2-0.8, 0.2-0.5, 0.2-0.3, 0.3-0.8, or 0.5-0.8.

For some applications, the functional coating is a hard coating, and the selection of the material from which the hard coating is made, as well as the shaping process, are such that the hard coating is reshaped without cracking the hard coating, without introducing significant stresses into the hard coating (of the type that could lead to the hard coating rupturing, or undergoing a stress crack during its lifetime), and without causing the hard coating to introduce significant stresses to the additional lens itself (of the type that could lead to the additional lens rupturing, or undergoing a stress crack during its lifetime).

Typically, the coating is selected such that it does not undergo changes to shape or cracking within a temperature range to which lenses of eyeglasses might typically be subjected to during use (e.g., from −10 degrees Celsius to 60 degrees Celsius).

By selecting the material from which the coating is made in the above-described manner, the coating can be applied to the additional lens at a first point in the manufacture of combined lens 20, and the shaping process can then be applied to the lens and the coating at a different point in the manufacture of lens combined lens 20. For example, the coating can be applied to additional lens 24 at a point of manufacture in which additional lenses are produced in bulk, and the shaping process can then be applied to the lens and the coating at a point of sale. For some such applications, combined lens 20 is a progressive lens that is manufactured at the point of sale according to a patient's prescription by combining base lens 22 (which is a single-focus optically-corrective lens) with additional lens 24 (which provides additive optically-corrective functionalities to the base lens). For example, the base lens may be a single-focus optically-corrective lens, and the additional lens may provide additive optically-corrective functionalities to the base lens, such that the combination of the base lens and the additional lens provide a progressive lens that matches the patient's prescription, e.g., as is generally described in U.S. Pat. No. 9,995,948 to Arieli, which is incorporated herein by reference.

For some applications, additional lens 24 is a plano lens that is coated with one or more functional coatings. For some such applications, the coated plano lens is applied to a base lens 22 that is a progressive lens. For example, base lens 22 may be a progressive lens that is manufactured using a direct-to-lens surfacing manufacturing process (e.g., a free-form manufacturing process). Typically, such progressive lenses are manufactured in a bespoke manner to match a given patient's prescription. When a progressive lens is manufactured using a direct-to-lens surfacing manufacturing process, a surface of the progressive lens (which is typically the back surface) is cut during the manufacturing process. Typically, functional coatings can only be applied to this surface after the cutting has been completed, because if the functional coatings were to be applied to the surface before the cutting has been completed, the coatings would become degraded by the cutting. Employing conventional techniques for applying functional coatings to the cut surface typically introduces a delay into the manufacturing process of such lenses, due to time-consuming chemical processes that are used (and which can only be applied after the lens has been cut to match the patient's prescription). This introduces a bottleneck into the manufacture of progressive lenses, which, in turn, means that such lenses are typically manufactured off-site in a laboratory, as opposed to being manufactured on-site at an optician. For some applications of the present invention, a plano additional lens that is pre-coated with one or more functional coatings is shaped to precisely conform with the curvature of the cut surface of the base progressive lens, using the techniques described hereinabove. Typically, the plano additional lens is then adhered to the cut surface of the base progressive lens, using the techniques described hereinbelow with reference to FIGS. 7A-D.

It is noted that, typically, a surface of a progressive lens (and, particularly, the cut surface of a progressive lens that is manufactured using a direct-to-lens surfacing manufacturing process) has a highly complex curvature. Nevertheless, using the techniques described herein, the additional lens can be reshaped such as to substantially conform with the curvature of the cut surface, without introducing substantial stresses (and any resulting optical distortions) to either the additional lens or to the functional coatings. For some applications, generally similar techniques to those described in the above paragraph are applied to a base progressive lens that is manufactured using a manufacturing process other than a direct-to-lens surfacing manufacturing process.

Reference is now made to FIG. 6, which is a schematic illustration of additional lens 24 being shaped, while being heated to a temperature at which the material from which the additional lens is made has a Tan Delta of more than 0.2 and/or less than 0.8, in accordance with some alternative applications of the present invention. The apparatus and methods used in conjunction with the apparatus shown in FIG. 6 are generally similar to those described hereinabove with reference to FIG. 5, except for the differences described below.

While FIG. 5 shows pressure-applying element 42 disposed above form 40, such that the pressure-applying element pushes the additional lens in a downward direction toward the form, for some applications, the pressure-applying element 42 is disposed below form 40, such that the pressure-applying element pushes the additional lens in an upward direction toward the form, as shown in FIG. 6.

For some applications, the curvature of form 40 is greater than the curvature to which the additional lens is to be shaped. The extent to which the additional lens in reshaped is thus typically controlled by the amount of pressure that the pressure-applying element applies to the additional lens, rather than being limited to the specific curvature of the form. This is schematically illustrated in FIG. 6, which shows a gap between additional lens 24 and form 40, at the center of the additional lens, even once the additional lens has been reshaped. Typically, this reduces contact between the additional lens and the form relative to if the additional lens were to be shaped by being pushed such that the additional lens makes full contact with the form, thereby reducing potential damage that could be caused by contact between the additional lens and the form. In addition, a single form is thereby capable of being used to generate a broad range of additional lens curvatures.

As described hereinabove, typically, during the shaping step, the additional lens is disposed inside oven 44, in order for the temperature of the additional lens to be maintained at a temperature that falls within the above-described temperature range. For some applications, as an alternative or in addition to the oven heating the additional lens during the shaping process, direct heating is applied to the additional lens in order to maintain precise control over the temperature to which the additional lens is heated. For some applications, direct heating is applied to the additional lens via pressure-applying element 42. For example, as shown an electrical heating element 45 may be embedded within the pressure-applying element. Alternatively or additionally, a heated fluid may be disposed inside the pressure-applying element. For some applications, direct heating is applied to the additional lens, by form 40 (which is typically made of glass) being heated. Alternatively or additionally, direct heating is applied to the additional lens using infrared radiation.

As described in the above paragraph, for some applications, electrical heating element 45 is embedded within the pressure-applying element and is configured to directly heat the additional lens, during the shaping step. For some applications, the heating element is shaped as a spiral, as shown. Furthermore, for some applications, the spiral is shaped such that gaps between adjacent windings of the spiral decrease from the center of the spiral toward the outside of the spiral. Typically, this shape of the heating element provides relatively uniform heating across the surface of the additional lens. For some applications, direct heating is applied to the additional lens in a relatively uniform manner using a different technique (e.g., using a heated fluid that is disposed inside the pressure-applying element, as described above).

It is noted that the above-described features, such as the use of the pressure-applying element to apply direct heat to the additional lens, as well as the materials, shapes, and designs described with reference to pressure-applying element 42 may be incorporated into other components described herein, such as pressure-applying element 42 as shown in FIG. 5, and/or pushing element 80 shown in FIGS. 7A-D.

Reference is now made to FIGS. 7A, 7B, 7C, and 7D which are schematic illustrations of respective steps of an adhesion process for adhering additional lens 24 to base lens 22, in accordance with some applications of the present invention. Typically, the steps shown in FIGS. 7A-D are performed subsequent to the additional lens having been reshaped such that its curvature conforms with the curvature of the base lens. Typically, the additional lens defines at least one convex surface and the base lens defines at least one concave surface, and the convex surface of the additional lens is adhered to the concave surface of the base lens. For some applications, when reshaping the additional lens (e.g., using the techniques described hereinabove), the curvature of the convex surface of the additional lens is made to be slightly greater than the curvature of the concave surface of the base lens, in order to facilitate the technique described with reference to FIGS. 7A-D (and, in particular, the step described with reference to FIG. 7C).

Figure 7A:
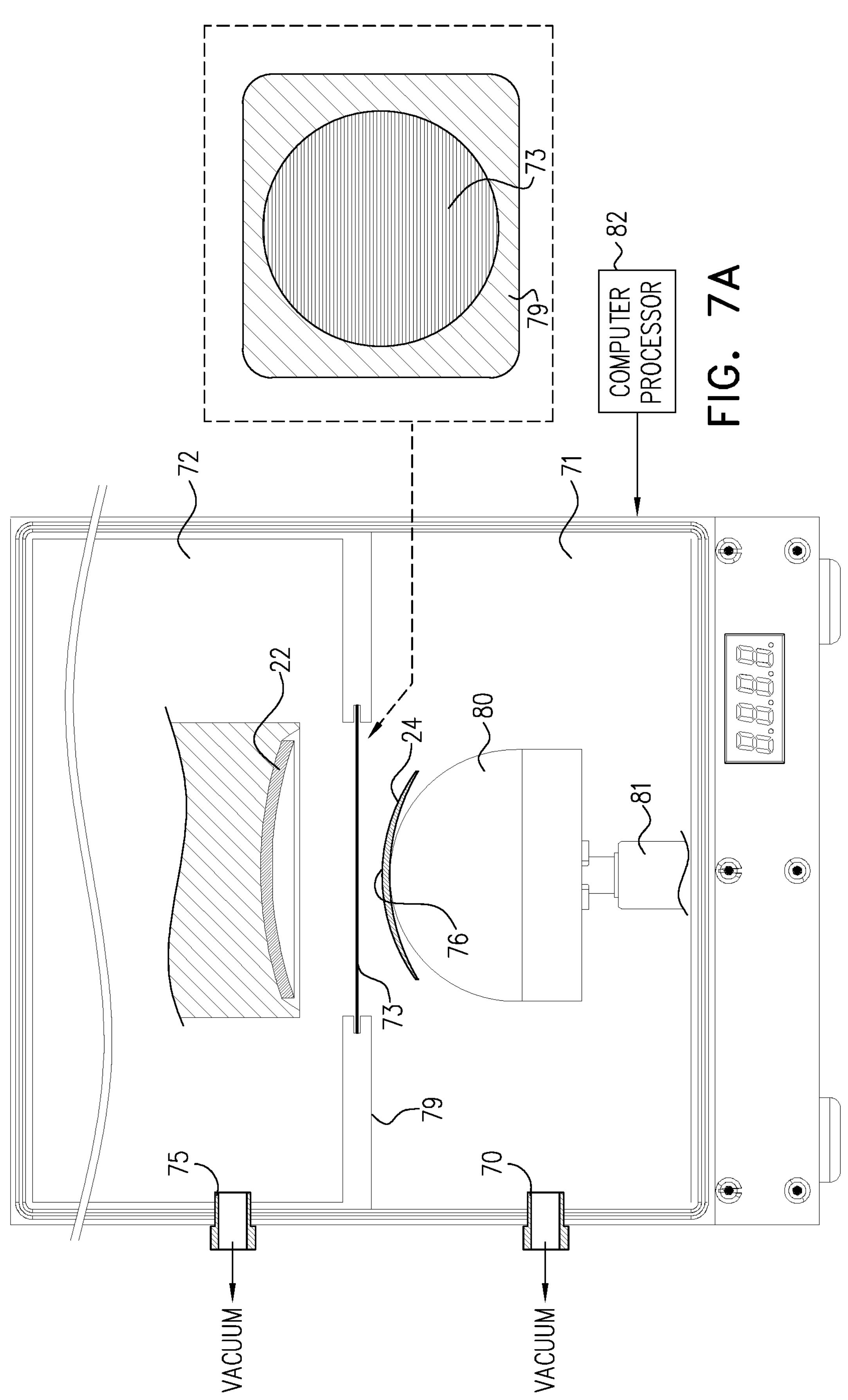
FIGS. 7A, 7B, 7C, and 7D are schematic illustrations of respective steps of an adhesion process for adhering an additional lens to a base lens, in accordance with some applications of the present invention.

For some applications, additional lens 24 is held in a first chamber 71 and base lens 22 is held in a second chamber 72, as shown in FIG. 7A. For some applications, each of chambers 71 and 72 function as ovens, in that the temperature of each of the chambers can be controlled. Alternatively, the chambers are not heated. Typically, chamber 71 is coupled to a source of vacuum pressure via a first tube 70 and chamber 71 is coupled to the same or an alternative source of vacuum pressure via a second tube 75, such that the pressure within each of the chambers can be controlled independently of each other.

Typically, a thin, flexible adhesive layer 73 (which is typically a pressure-sensitive adhesive, both sides of which are adhesive) is held between the two chambers. For example, as shown in the cross-section view of the chambers, adhesive layer 73 may be held between the first and second chambers by a solid plate 79. Typically, the adhesive layer has a uniform thickness, which is typically more than 20 microns (e.g., more than 50 microns), and/or less than 300 microns (e.g., less than 200 microns), for example, 20-300 microns, or 50-200 microns. For some applications, the additional lens is adhered to the base lens by adhesive layer 73, without leaving significant air bubbles or other spaces in place between either one of the lenses and the adhesive layer, by controlling the pressure within the chambers and moving the lenses toward the adhesive layer in accordance with the steps shown in FIGS. 7A-D. Typically, during much of the procedure, vacuum pressure (e.g., negative pressure of between 1 millibar and 1 bar) is generated within each of the chambers, such as to reduce the pressure below ambient pressure. At certain stages of the procedure, pressure in one or both of the chambers may be increased or decreased, as described hereinbelow. For some applications, at one or more stages during the adhesion process, heating is applied to one or both of the lenses, and/or the adhesive layer, and/or one or both of the pressure chambers.

Figure 7B:
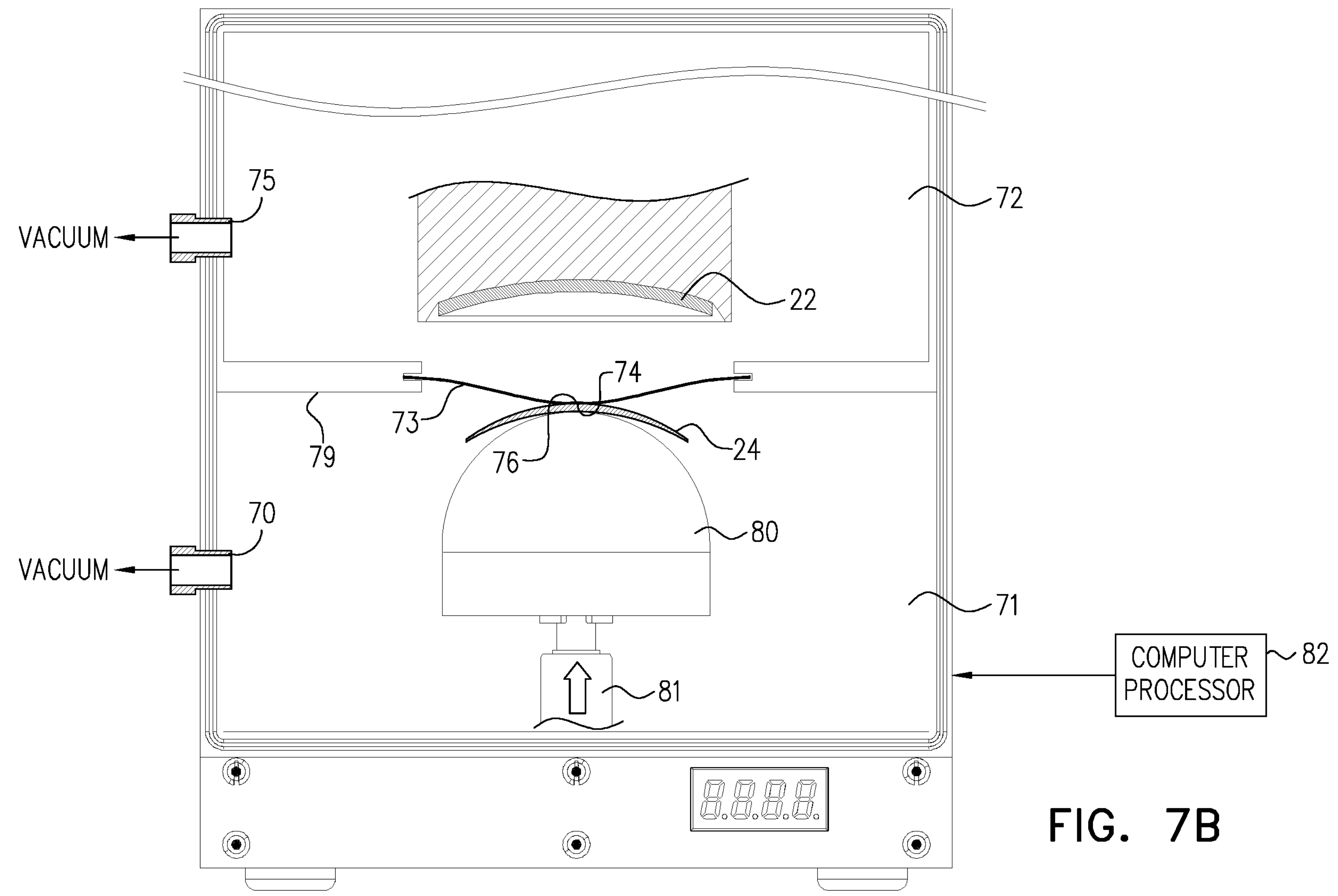

The convex surface of the additional lens has a central region 76. As shown in FIG. 7B, for some applications, a pressure difference is generated between chambers 71 and 72 that is such as to cause the adhesive layer to form a convex curve that faces toward the convex surface of the additional lens, such that a central region 74 of the adhesive layer is closer to central region 76 of the convex surface of the additional lens than any other two points on the adhesive layer and the convex surface of the additional lens. As described above, typically, the pressure within chambers 71 and 72 is controlled independently of one another. For some applications, at this stage, the pressure in chamber 71 is made to be lower than in chamber 72, in order to cause the adhesive layer to curve in the above-described manner.

While the adhesive layer is curving toward the additional lens, the additional lens and the adhesive layer are brought toward each other, e.g., using a mechanical pushing element 80. For some applications, mechanical pushing element 80 has a generally similar shape, size, and/or functionalities to those described hereinabove with reference to pressure-applying element 42, shown in FIGS. 5-6. For some applications, the pushing element is a dome-shaped pushing element that is hydraulically controlled using a piston 81, as shown. Typically, adhesive layer 73 and additional lens 24 first touch each other at their respective central regions 74 and 76. As the additional lens continues to be brought toward the adhesive layer, contact between the additional lens and the adhesive layer radiates outwardly from central region 76 of the convex surface of the additional lens, until the convex surface of the additional lens becomes fully covered by the adhesive layer. It is noted that for some applications, the adhesive layer is not made to curve toward the additional lens. Nevertheless the first point of contact between the additional lens and the adhesive layer is typically at the center of the additional lens, by virtue of the convex curvature of the convex surface of the additional lens. Typically, by causing the additional lens to first contact the adhesive layer at its center and then causing contact between the additional lens and the adhesive layer to radiate outwardly, air bubbles are forced out from between the additional lens and the adhesive layer, thereby substantially preventing air bubbles from being trapped between the additional lens and the adhesive layer.

For some applications, prior to bringing the additional lens and the adhesive layer toward each other, vacuum pressure is established at least in first chamber 71 (i.e., the pressure within the first chamber is made to be less than ambient pressure), in order to remove air bubbles from between the adhesive layer and the additional lens. The establishment of vacuum pressure within the first chamber is typically performed irrespective of whether differential pressure is established between the first and second chambers at this stage (i.e., in order to cause the adhesive layer to curve, as described hereinabove). For some applications, subsequent to adhering the adhesive layer to the additional lens, in order to remove any smaller air bubbles which may nevertheless have become trapped between the additional lens and the adhesive layer and/or any vacant volumes which may be located between the additional lens and the adhesive layer, pressure within chamber 71 and/or chamber 72 is increased (e.g., to ambient pressure). The increase in pressure typically causes any small air bubbles which may have become trapped between the additional lens and the adhesive layer to percolate out from between the additional lens and the adhesive layer and causes any vacant volumes which may be located between the additional lens and the adhesive layer to be removed, by applying pressure to the adhesive layer.

Figure 7C:
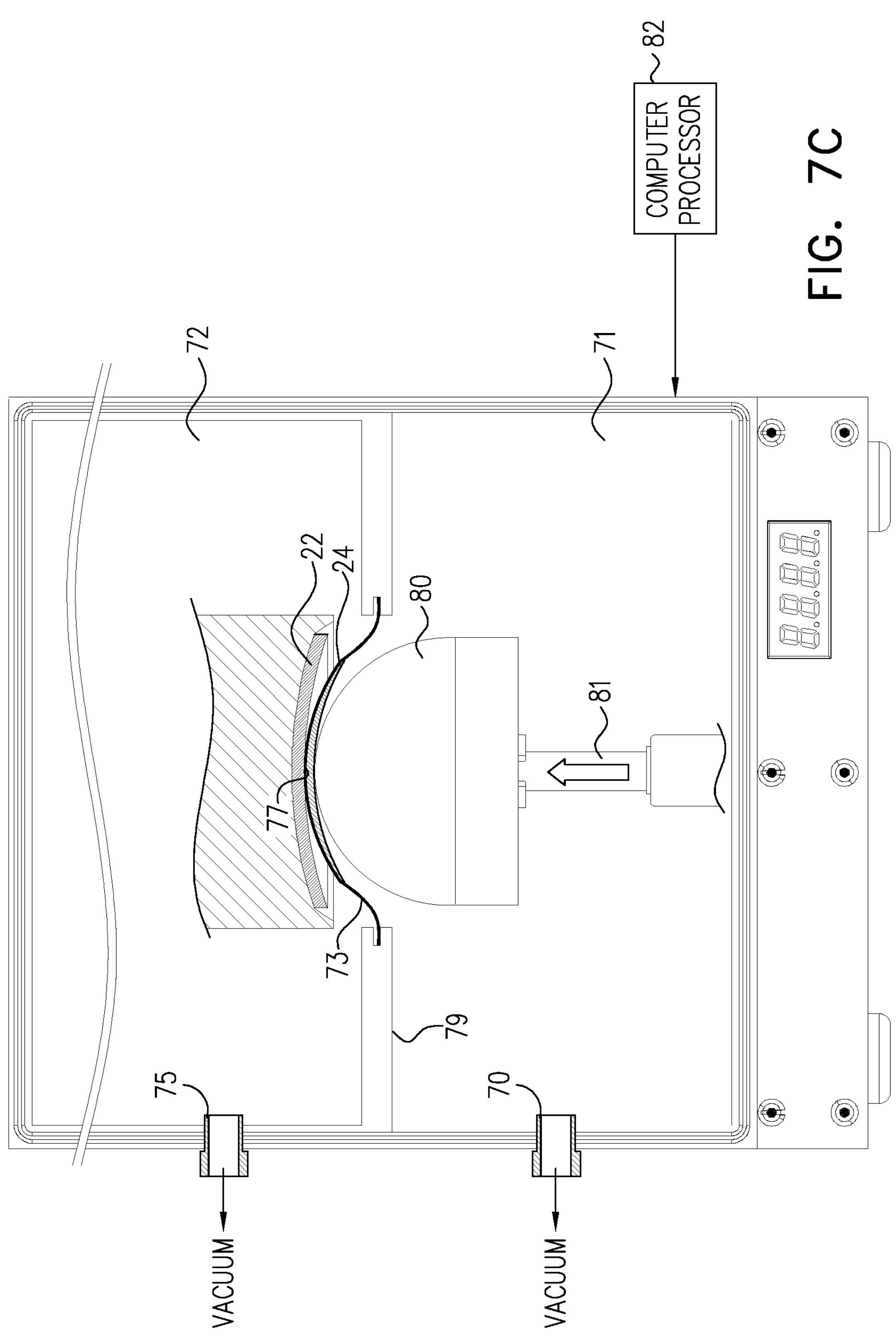
Figure 7D:
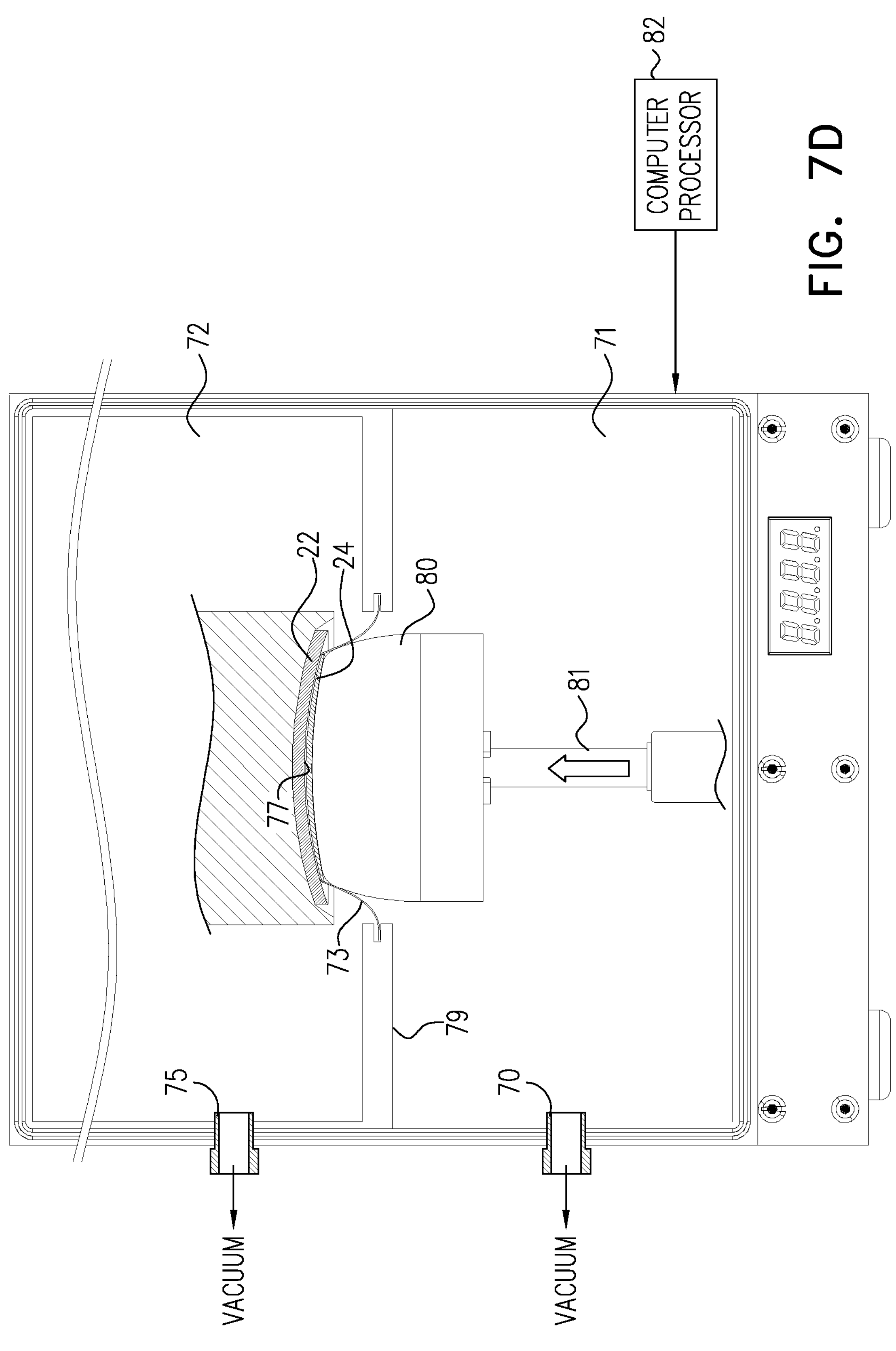

Referring to FIGS. 7C and 7D, subsequent to adhering adhesive layer 73 to additional lens 24, the additional lens and the adhesive layer are brought toward base lens 22 (e.g., using mechanical pushing element 80). For some applications, prior to bringing the additional lens and the adhesive layer toward the base lens, vacuum pressure is established at least in second chamber 72 (i.e., the pressure within the second chamber is made to be less than ambient pressure), in order to remove air bubbles from between the adhesive layer and the base lens. As described hereinabove, typically, during the reshaping of the additional lens, the convex curvature of the surface of the additional lens that is to be adhered to the adhesive layer is made to be greater than the concave curvature of the surface of the base lens that is to be adhered to the adhesive layer. Thus, the respective shapes of the additional lens and the base lens are typically such that the first point of contact between the adhesive layer (which at this stage conforms to the shape of the additional lens) and the base lens is at a central region 77 of the concave surface of base lens 22 (as shown in FIG. 7C). As the additional lens continues to be pushed toward the base lens, contact between the adhesive layer and the base lens radiates outwardly from the center of the concave surface of the base lens, until the concave surface of the base lens becomes fully covered by the adhesive layer (as shown in FIG. 7D). Typically, by causing the base lens to first contact the adhesive layer at its center and then causing contact between the base lens and the adhesive layer to radiate outwardly, air bubbles are forced out from between the base lens and the adhesive layer, thereby substantially preventing air bubbles from being trapped between the base lens and the adhesive layer.

Figure 8:
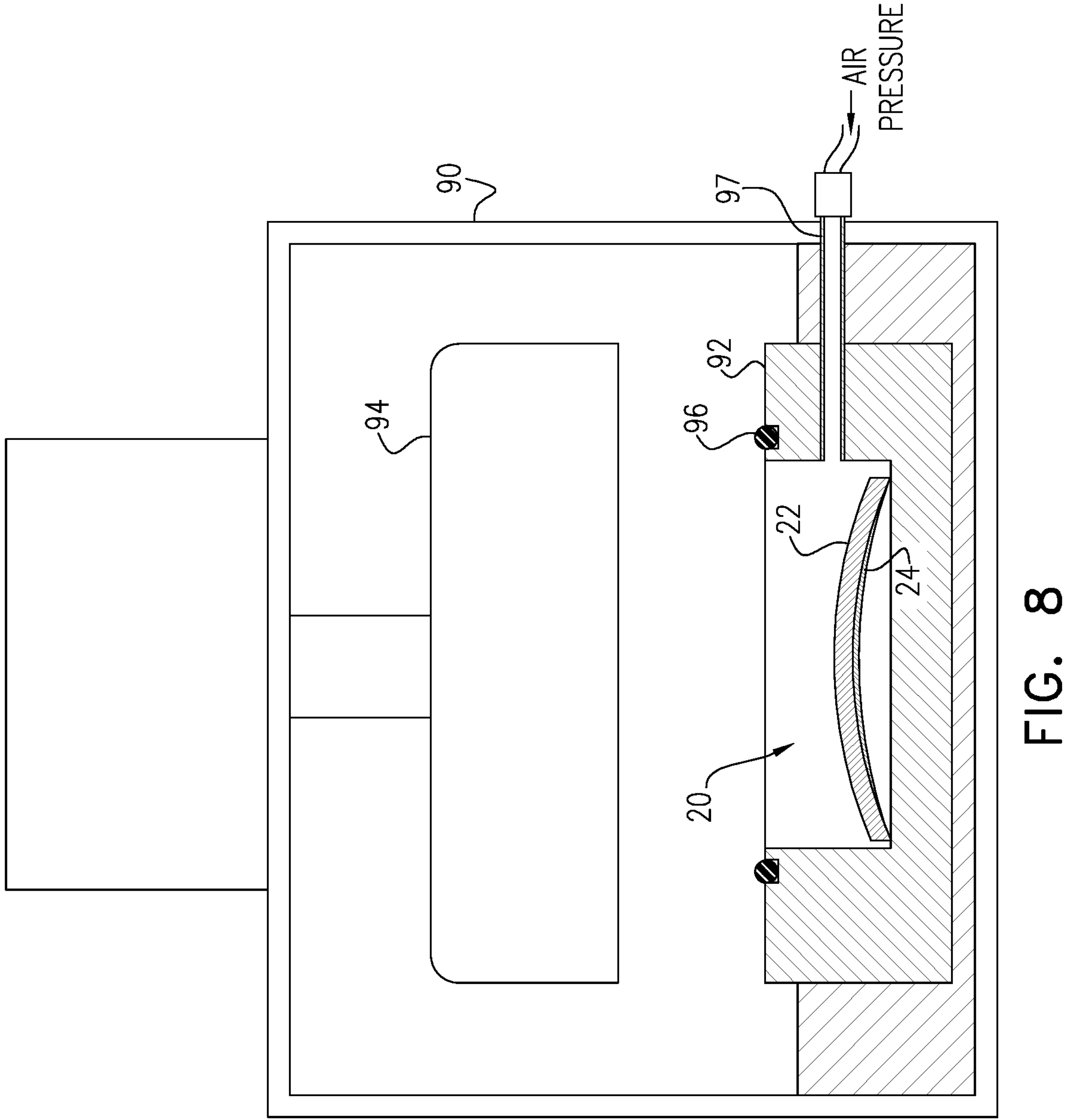
FIG. 8 is a schematic illustration of a chamber that is used to apply heat and/or pressure to the combined additional lens and base lens after the additional lens and the base lens have been adhered to each other, in accordance with some applications of the present invention.

For some applications, in order to remove any smaller air bubbles which may nevertheless have become trapped between the base lens and the adhesive layer and/or any vacant volumes which may be located between the additional lens and the adhesive layer, pressure within chamber 71 and/or 72 is increased (e.g., to ambient pressure). The increase in pressure typically causes any small air bubbles which may have become trapped between the base lens and the adhesive layer to percolate out and causes any vacant volumes which may be located between the additional lens and the adhesive layer to be removed. Alternatively or additionally, mechanical pressure is applied to one or both sides of the combined lenses (e.g., using mechanical pushing element 80 and/or an additional pushing element that is configured to push against the outer surface of base lens 22), in order to cause any small air bubbles which may have become trapped between the additional lens and the adhesive layer and/or between the base lens and the adhesive layer to percolate out, and/or in order to remove any vacant volumes which may be located between the additional lens and the adhesive layer and/or between the base lens and the adhesive layer. Further alternatively or additionally, the combined lens is transferred to a separate chamber that is used to apply heat and pressure to one or both sides of the combined lenses, e.g., as shown in FIG. 8.

As described hereinabove, for some applications, each of chambers 71 and 72 functions as an oven, in that the temperature of each of the chambers can be controlled. For some applications, additional elements within the chambers, such as pushing element 80 may be temperature-controllable. For some applications, during one or more of the steps described with reference to FIGS. 7A-D, the base lens, the additional lens, the adhesive layer, the first pressure chamber, and/or the second pressure chamber is heated. For example, one or more of the aforementioned elements may be heated to temperature of between 25 and 75 degrees Celsius.

It is noted that, although FIGS. 7A-D show the adhesive layer first being applied to the additional lens and subsequently applying the adhesive layer to the base lens, the scope of the present application includes first applying the adhesive layer to the base lens and subsequently applying the adhesive layer to the additional lens. Similarly, although the arrangement schematically illustrated in FIGS. 7A-D shows the additional lens disposed beneath the adhesive layer and the base lens, the scope of the present application includes performing generally similar techniques but with the base lens disposed beneath the adhesive layer and the additional lens, and/or with the base lens, the adhesive layer, and the additional lens disposed alongside each other, and/or a different arrangement.

For some applications, one or more of the steps described with reference to FIGS. 7A-D are performed by a computer processor 82 that is configured to control pressure in the pressure chambers, and/or to control movement of mechanical elements (e.g., mechanical pushing elements). Typically, the operations described herein that are performed by computer processor 82, transform the physical state of a memory, which is a real physical article that is in communication with the computer processor, to have a different magnetic polarity, electrical charge, or the like, depending on the technology of the memory that is used. The computer processor is typically a hardware device programmed with computer program instructions to produce a special-purpose computer. For example, when programmed to perform the techniques described herein, the computer processor typically acts as a special-purpose lens-adhering computer processor.

Reference is now made to FIG. 8, which is a schematic illustration of a chamber 90 to which combined lens 20 is transferred after additional lens 24 has been adhered to base lens 22, in accordance with some applications of the present invention. Typically, heat and/or pressure is applied to the combined lens within chamber 90. For some applications, as shown, the combined lens is placed inside a receptacle 92. An upper cover 94 is configured to cover the receptacle, such as to form a sealed inner chamber within which the combined lens is disposed. Typically, a seal 96 (e.g., an O-ring) is disposed between the upper cover and the receptacle in order to seal the interface between them. For some applications, once the sealed inner chamber has been formed, pressure is applied to the outer surfaces of the combined lens, for example, by pumping air into the sealed inner chamber, via an air inlet tube 97. Typically, the application of pressure is such as to cause any small air bubbles which may have become trapped between the additional lens and the base lens (e.g., between the additional lens and the adhesive layer and/or between the base lens and the adhesive layer) to percolate out, and/or in order to remove any vacant volumes which may be located between the additional lens and the base lens (e.g., between the additional lens and the adhesive layer and/or between the base lens and the adhesive layer).

For some applications, chamber 90 is an oven, such that the temperature within the chamber is controlled. Alternatively or additionally, one or more surfaces (e.g., inner surfaces of receptacle 92 and/or upper cover 94) which are placed into contact with the combined lens are used to directly apply heat to the combined lens, such as to control a temperature to which the combined lens is heated during this stage. Further alternatively or additionally, the air that is used to apply pressure to the combined lens is heated such as to control a temperature to which the combined lens is heated during this stage. Typically, the combined lens is heated to a temperature that is such as to remove any residual stresses in one or both of the lenses, which could lead to degradation of the lenses over time.

Tolerance Measurements

As described hereinabove, it is typically desirable that, after additional lens 24 is shaped in the manner described hereinabove, the additional lens not only retains its optical design at predesignated measuring areas to within ISO standard after being reshaped and adhered to base lens 22, but also retains approximately the same residual cylinder quantities at predesignated, clinically important areas of the lens. The retention of the optical design of the additional lens is typically measured using the following techniques:

Given an individual patient's vision correction prescription containing a prescribed amount of sphere correction in diopters, cylinder correction in diopters, prescribed cylinder axis direction in degrees, and power addition value in diopters, there is a need to reshape the additional lens to conform with the curvature of base lens 22. The base lens typically has a spherical or aspherical front surface, a toric, spherical atoric, or aspherical back surface, a specified center thickness and a specified index of refraction. The base lens is typically selected such that its optical sphere, and cylinder prescription are close to the patient's target prescription to within ISO standard. The additional lens is typically adhered to the base lens in such a manner that the base lens is rotated by an angle specified by the patient's cylinder axis prescription in relation to the additional lens prior to the adhesion of the lenses to each other, to an accuracy within the ISO standard. The adhesion is typically such that the combined lens 20 has the following properties when assembled into a frame with the correct orientation:

- Difference between the sphere value of lens 20 and patient's target sphere Rx value is within ISO standard when measured with an ISO regulated measuring device at distance reference position of lens 20.
- Difference between the cylinder value of lens 20 and patient's target cylinder Rx value is within ISO standard when measured with an ISO regulated measuring device at distance reference position of lens 20.
- Difference between the cylinder axis value of lens 20 and patient's target cylinder axis Rx value is within ISO standard when measured with an ISO regulated measuring device at distance reference position of lens 20.
- Difference between addition of lens 20 (the mean-power value measured at near reference position of lens 20) and patient's target addition Rx value is within ISO standard when measured with an ISO regulated measuring device.

It is well known to those familiar with the art of ophthalmic lens design, that when evaluating the optical performance of ophthalmic lenses, a common methodology is to divide the full ophthalmic lens area into many small sub-areas, and to study the residual sphere, cylinder, and cylinder axis values at each of these sub-areas individually. These sub-areas usually measure roughly four millimeters in spatial extent, and may be of a round shape, or of a rectangular shape. The residual sphere and cylinder of the lens at each such sub-area are the values obtained by measuring the optical properties of the lens at each sub-area, and subtracting the patient's Rx from these values. Since the optical corrective properties of the patient Rx and of the lens are not scalar or vector quantities, the following formulas can be used to calculate these values mathematically:

$$m_L(x,y)=\begin{pmatrix}\mathrm{Cos}(Ax(x,y)) & \mathrm{Sin}(Ax(x,y))\\ -\mathrm{Sin}(Ax(x,y)) & \mathrm{Cos}(Ax(x,y))\end{pmatrix}\begin{pmatrix}S(x,y) & 0\\ 0 & S(x,y)+C(x,y)\end{pmatrix}\begin{pmatrix}\mathrm{Cos}(Ax(x,y)) & -\mathrm{Sin}(Ax(x,y))\\ \mathrm{Sin}(Ax(x,y)) & \mathrm{Cos}(Ax(x,y))\end{pmatrix}$$

Here $m_L(x,y)$ is the sphero-cylindrical matrix of the lens measured at a sub-area centered at location (x,y), S(x,y) is the sphere power of the lens measured for said sub-area, C(x,y) is the cylinder of the lens measured for said sub-area and Ax(x,y) is the cylinder axis of the lens measured for said sub-area.

Similarly, the patient's Rx can be represented by an Rx sphero-cylindrical matrix $$m_{Rx}=\begin{pmatrix}\mathrm{Cos}(Ax_{Rx}) & \mathrm{Sin}(Ax_{Rx})\\ -\mathrm{Sin}(Ax_{Rx}) & \mathrm{Cos}(Ax_{Rx})\end{pmatrix}\begin{pmatrix}S_{Rx} & 0\\ 0 & S_{Rx}+C_{Rx}\end{pmatrix}\begin{pmatrix}\mathrm{Cos}(Ax_{Rx}) & -\mathrm{Sin}(Ax_{Rx})\\ \mathrm{Sin}(Ax_{Rx}) & \mathrm{Cos}(Ax_{Rx})\end{pmatrix}$$

The residual sphere and cylinder values of said lens sub-area in relation to the patient's Rx are acquired in the following manner:

a. Calculate the residual sphero-cylindrical matrix $m_{Res}(x,y)=m_L(x,y)-m_{Rx}$.
b. Find the eigen values and corresponding eigen-directions of matrix $m_{Res}$.
c. In cylinder minus convention, the residual sphere value of said sub-area is the most positive eigenvalue of the matrix, the residual cylinder value is the difference between the least positive and most positive eigen value, and the cylinder axis is the eigen-direction of the most positive eigen-value.

There are many progressive lens designs commercially available today, designed by several different lens design vendors. These lens designs differ one from the other in the values of residual optical properties over their many sub-areas, when referencing a patient's Rx which the lens is designed to correct. The most common parameter that differentiates progressive lens designs is the length of power progression. Broadly, this value measures how many millimeters along the channel it takes the mean power to ascend from the far-vision value at the distance reference position to its target addition.

In accordance with some applications of the present invention, additional lens not only retains its optical design at predesignated measuring positions (as described above) after being reshaped and adhered to base lens 22, but also retains approximately the same residual cylinder quantities at pre-designated, clinically important areas of the lens.

In particular, there are measurement procedures that can be applied to additional lens 24 and to combined lens 20, which is composed of the additional lens and base lens 22. These procedures measure optical properties across the majority of the sub-areas of the lens. From these measurements the maps of the residual properties can easily be calculated for each of the lenses and then compared one to the other in different regions using different quantity metrics. The residual properties of the additional lens are calculated relative to a patient who has zero sphere and cylinder correction, while the residual properties of the combined lens are calculated relative to a patient with a given target Rx, which the base lens typically corrects for. For example, one quantity metric can be defined in the following way: calculate the distance in millimeters one has to traverse from the local minimum of the absolute value of the residual cylinder graph closest to the channel, at a Y coordinate equal to that of the near vision reference point, to the left and to the right, until one reaches a threshold of 0.5D absolute value of the residual cylinder. The sum of those two distances can then be compared, when calculated for the residual cylinder of the additional lens (prior to the reshaping) and for the absolute value of the residual cylinder of combined lens 20. Similarly, such a calculation can be carried out with a Y coordinate higher (closer to the fitting point) by 2 mm, by 4 mm, by 6 mm and by 8 mm. Typically, when such quantity metrics are calculated for the measurement maps of the additional lens (prior to the reshaping) and to combined lens 20, when the techniques described herein have been applied to the additional lens, it has been found that the difference is no more than 10% for lenses having a sphere power between −2 D and +2 D, and a cylinder value between −2 and 0 in minus cylinder format.

Figures 9A, 9B:
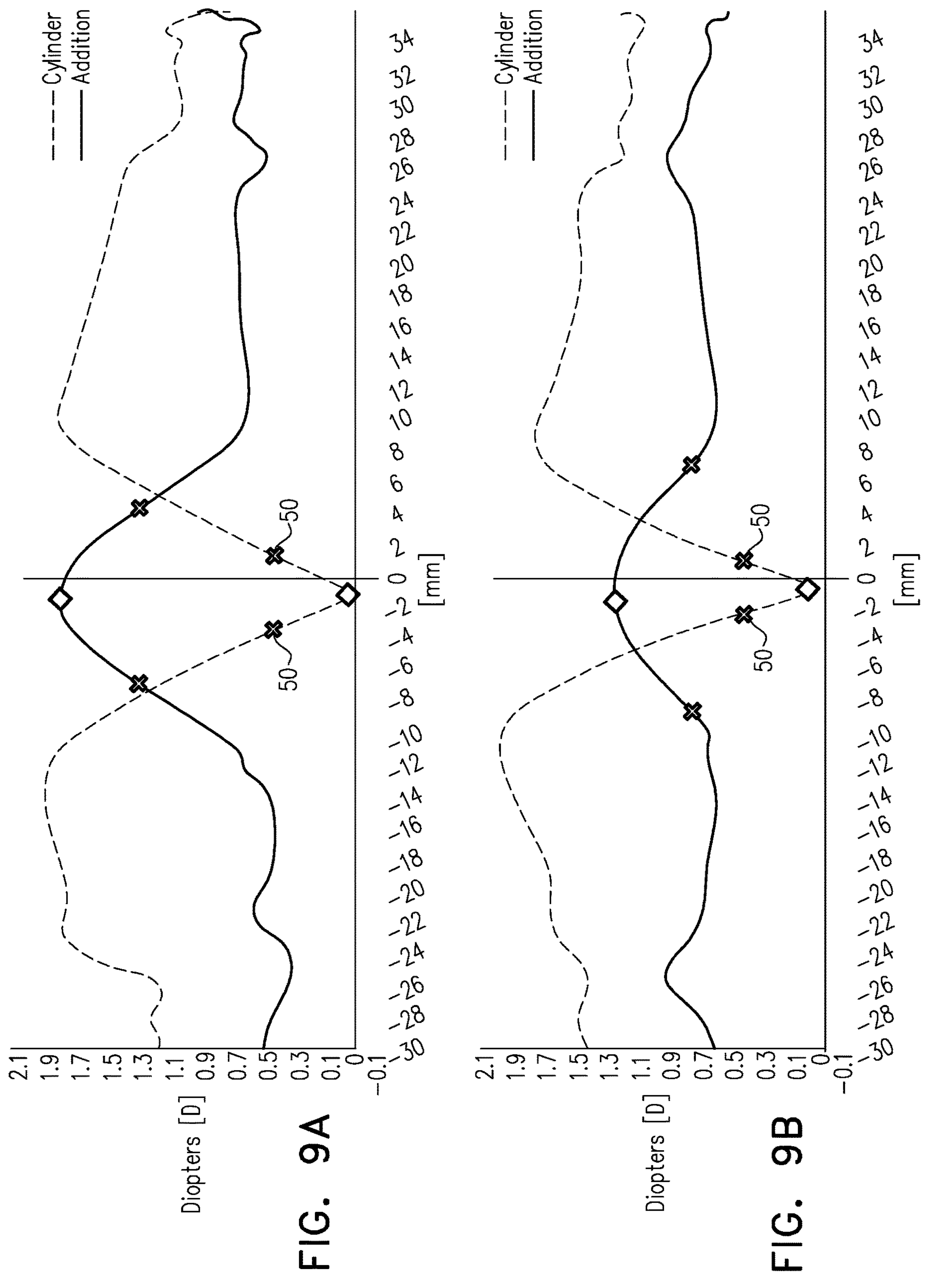
FIGS. 9A and 9B are graphs demonstrating how tolerance measurements are performed on a lens that is made in accordance with some applications of the present invention.

Reference is now made to FIGS. 9A and 9B, which are graphs demonstrating the above-described principles. In FIG. 9A, a horizontal cross-cut is shown at the near-vision reference point of the residual cylinder (dashed curve) and mean power addition (solid curve) of a measured additional lens, prior to reshaping. One can calculate the distance in millimeters one has to traverse from the local minimum of the absolute value of the cylinder graph closest to the channel, to the left and to the right until one reaches a threshold of 0.5D unwanted cylinder. These points are marked as points 50 in the graph. The distance between these two points can serve as a quantity metric for assessing the said lens' residual cylinder in the region of the prism reference point. Similarly, a measurement can be taken of combined lens 20 composed of additional lens 24 and base lens 22, and this can be assessed with the same quantity metric. This is shown in FIG. 9B. As described hereinabove, typically, when such quantity metrics are calculated for the measurement maps of the additional lens (prior to reshaping) and to combined lens 20, when the techniques described herein have been applied to the additional lens, it has been found that the difference is no more than 10% for lenses having a sphere power between −2 D and +2 D, and a cylinder value between −2 and 0 in minus cylinder format.

Those familiar with the art know that high Rx single vision lenses may also exhibit significant residual sphere and cylinder values at sub-areas far from the optical center of the lens when measured with a mapping device. For lenses that have relatively high Rx (either Sphere smaller than −2 D or greater than +2 D, and/or cylinder smaller than −2 D) one has to use a modified method for evaluating the optical performance of the combined lens 20 in relation to the additional lens and the base lens which is composed of the following steps:

1. Measure the residual optical properties of the pre-molded additional lens at every sub-area of the additional lens and calculate each sub-area's sphero-cylindrical matrix $m_{add}(x,y)$
2. Measure the residual optical properties of the base lens at every sub-area of the base lens and calculate each sub-area's sphero-cylindrical matrix $m_{bl}(x,y)$.
3. Calculate a theoretical sphero-cylindrical matrix representing the sum of the base lens' and the additional lens' residual properties for each sub-area given by $m_{th}(x,y)=m_{bl}(x,y)+m_{add}(x,y)$.

4. Calculate the residual cylinder $C_{th}(x,y)$ of $m_{th}(x,y)$ at each sub-area as the difference between the least positive and the most positive eigen-value of $m_{th}(x,y)$.
5. Plot absolute value of $C_{th}(x,y)$ cylinder thus acquired on a map.
6. Measure the residual optical properties of the combined lens at every sub-area of the lens and calculate each sub-area's sphero-cylindrical matrix $m_{cl}(x,y)$.
7. Calculate the residual optical cylinder $C_{cl}(x,y)$ of $m_{cl}(x,y)$ at each sub-area as the difference between the least positive and the most positive eigen-value of $m_{cl}(x,y)$.
8. Plot residual cylinder $C_{cl}(x,y)$ thus acquired on a map.
9. Calculate the quantity metrics described above for absolute value of $C_{th}(x,y)$ and absolute value of $C_{cl}(x,y)$ at the Y of the near reference position, and with a Y coordinate higher (closer to the fitting point) by 2 mm, by 4 mm, by 6 mm and by 8 mm.

Typically, when such quantity metrics are calculated for the measurement maps of the additional lens (prior to reshaping) and to combined lens 20, when the techniques described herein have been applied to the additional lens, it has been found that the difference is no more than 10%.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. An apparatus for adhering a first lens having at least one convex surface to a second lens having at least one concave surface, to thereby form a combined lens having a given optical design, the apparatus comprising:

a first pressure chamber comprising a first chamber atmosphere and configured to house the first lens, and a second pressure chamber comprising a second chamber atmosphere and configured to house the second lens, wherein pressure of the first chamber atmosphere and the second chamber atmosphere is independently controllable;

an adhesive layer dividing between the first and second pressure chambers to thereby maintain a difference in pressure between the first and second pressure chambers, wherein a first side of the adhesive layer is exposed to the first chamber atmosphere of the first pressure chamber and a second side of the adhesive layer is exposed to the second chamber atmosphere of the second pressure chamber;

a mechanical pushing element; and a computer processor configured: to drive the mechanical pushing element to bring the convex surface of the first lens into contact with the adhesive layer, such that a central region of the convex surface of the first lens initially contacts the adhesive layer, and the contact between the convex surface of the first lens and the adhesive layer subsequently radiates outwardly from the central region of the convex surface of the first lens, until the convex surface of the first lens becomes covered by the adhesive layer; and to drive the mechanical pushing element to bring the concave surface of the second lens into contact with the adhesive layer, such that a central region of the concave surface of the second lens initially contacts the adhesive layer, and the contact between the concave surface of the second lens and the adhesive layer subsequently radiates outwardly from the central region of the concave surface of the second lens, until the concave surface of the second lens becomes covered by the adhesive layer so as to form the combined lens, the combined lens comprising the first lens, second lens and adhesive layer, the combined lens being configured to be transferred to an additional chamber.

2. The apparatus according to claim 1, wherein the computer processor is configured to reduce the pressure within the first pressure chamber to below ambient pressure while driving the mechanical pushing element to bring the convex surface of the first lens into contact with the adhesive layer.

3. The apparatus according to claim 1, wherein the computer processor is configured to reduce the pressure within the second pressure chamber to below ambient pressure while driving the mechanical pushing element to bring the concave surface of the second lens into contact with the adhesive layer.

4. The apparatus according to claim 1, wherein the computer processor is configured to cause the adhesive layer to form a convex curve that faces toward the convex surface of the first lens by applying a pressure difference between the first and second pressure chambers.

5. The apparatus according to claim 1, wherein the apparatus is for use with the first lens and the second lens, wherein the first and second lenses are shaped such that a curvature of the convex surface of the first lens is greater than a curvature of the concave surface of the second lens, and wherein the computer processor is configured, subsequent to the convex surface of the first lens being covered with the adhesive layer, to move the first lens and the adhesive layer and the second lens toward each other, such that the central region of the convex surface of the first lens with the adhesive layer disposed thereon contacts the central region of the concave surface of the second lens.

6. The apparatus according to claim 1, wherein the computer processor is configured to remove any air bubbles that become trapped between the first lens and the adhesive layer and any vacant volumes that are disposed between the first lens and the adhesive layer, by applying air pressure within the first pressure chamber.

7. The apparatus according to claim 1, wherein the computer processor is configured to remove any air bubbles that become trapped between the second lens and the adhesive layer and any vacant volumes that are disposed between the second lens and the adhesive layer, by applying air pressure within the second pressure chamber.

8. The apparatus according to claim 1, wherein the mechanical pushing element is configured to remove any air bubbles that become trapped between the first lens and the adhesive layer and any vacant volumes that are disposed between the first lens and the adhesive layer, by applying mechanical pressure.

9. The apparatus according to claim 1, wherein the mechanical pushing element is are configured to remove any air bubbles that become trapped between the second lens and the adhesive layer and any vacant volumes that are disposed between the second lens and the adhesive layer, by applying mechanical pressure.

10. The apparatus according to claim 1, further comprising a heating and/or additional pressure chamber that is configured to remove any air bubbles that become trapped between the first lens and the adhesive layer, any air bubbles that become trapped between the second lens and the adhesive layer, any vacant volumes that are disposed between the first lens and the adhesive layer, and any vacant volumes that are disposed between the second lens and the adhesive layer.

11. The apparatus according to claim 1, wherein a thickness of the adhesive layer is between 20 and 300 microns.

12. The apparatus according to claim 11, wherein the thickness of the adhesive layer is between 50 and 200 microns.

13. The apparatus according to claim 1, further comprising a heating component that is configured, at one or more stages during the adhering, to heat at least one element selected from the group consisting of: the first lens, the second lens, the adhesive layer, the first pressure chamber, the second pressure chamber, and any combination thereof.

14. The apparatus according to claim 13, wherein the heating component is configured to heat the at least one element to a temperature of between 25 and 75 degrees Celsius.

15. The apparatus according to claim 13, wherein the heating component is configured to heat the at least one element for a time period of 0.1 seconds to 1 hour.

16. The apparatus according to claim 1, wherein the mechanical pushing element is made of a material having a hardness of less than 90 Shore A.

17. The apparatus according to claim 16, wherein the first mechanical pushing element is made of a material having a hardness of between 20 and 85 Shore A.

18. The apparatus according to claim 1, wherein the mechanical pushing element is are configured to push the first lens into contact with the adhesive layer and the second lens.

* * * * *